United States Patent
Mizuno

(10) Patent No.: US 11,065,897 B2
(45) Date of Patent: Jul. 20, 2021

(54) INFORMATION PROCESSING APPARATUS GENERATING DISPLAY SCREEN DATA BASED ON INFORMATION ON RESIDUAL QUANTITY OF PRINTING AGENT

(71) Applicant: BROTHER KOGYO KABUSHIKI KAISHA, Nagoya (JP)

(72) Inventor: Akiko Mizuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/911,528

(22) Filed: Jun. 25, 2020

(65) Prior Publication Data
US 2020/0324563 A1 Oct. 15, 2020

Related U.S. Application Data

(63) Continuation of application No. 16/356,050, filed on Mar. 18, 2019, now Pat. No. 10,696,074.

(30) Foreign Application Priority Data

Mar. 20, 2018 (JP) .............................. JP2018-053424

(51) Int. Cl.
*B41J 29/38* (2006.01)
*H04N 1/00* (2006.01)

(52) U.S. Cl.
CPC .......... *B41J 29/38* (2013.01); *H04N 1/00477* (2013.01)

(58) Field of Classification Search
CPC ................... B41J 2/17566; B41J 29/38; B41J 2002/17589; B41J 2/175; B41J 2/17543; H04N 1/00477
See application file for complete search history.

(56) References Cited

U.S. PATENT DOCUMENTS

| 6,330,402 | B1 | 12/2001 | Sakurai et al. |
| 2007/0008351 | A1* | 1/2007 | Teshigawara ........ B41J 2/17566 347/7 |
| 2009/0174896 | A1 | 7/2009 | Nakamura |

(Continued)

FOREIGN PATENT DOCUMENTS

| JP | 2001-83846 A | 3/2001 |
| JP | 2008-116623 A | 5/2008 |

(Continued)

*Primary Examiner* — Jannelle M Lebron
(74) *Attorney, Agent, or Firm* — Merchant & Gould P.C.

(57) ABSTRACT

In an information processing apparatus, a processor acquires first and second information on residual quantities of printing agent stored in first and second cartridges respectively. The first cartridge is mounted on a portion including a tank. The processor generates display screen data including first and second objects. The first object has a first position corresponding to a minimum residual quantity of the printing agent in a first state where the printing agent remains in the first cartridge. The second object has a second position corresponding to a maximum residual quantity of the printing agent, and a third position corresponding to a minimum residual quantity of the printing agent in a second state where the printing agent does not remain in the first cartridge but remains in the tank. The first position and one of the second and third positions are aligned at a reference position.

42 Claims, 11 Drawing Sheets

(56) References Cited

U.S. PATENT DOCUMENTS

| | | | |
|---|---|---|---|
| 2012/0050359 A1 | 3/2012 | Koganehira et al. | |
| 2013/0028616 A1* | 1/2013 | Kunihiro | G06F 3/1229 |
| | | | 399/27 |
| 2017/0168417 A1 | 6/2017 | Arai | |

FOREIGN PATENT DOCUMENTS

| | | |
|---|---|---|
| JP | 2015-87901 A | 5/2015 |
| JP | 2017-111231 A | 6/2017 |

* cited by examiner

FIRST STORAGE STATE S1

SECOND STORAGE STATE S2

FIG. 4

MANAGEMENT DATABASE $\swarrow PD$

| SERIAL NUMBER | MODEL NAME | IP ADDRESS | SUPPLY METHOD | TOTAL PRINTABLE SHEET NUMBER TN | TANK PRINTABLE SHEET NUMBER SN | REMAINING PRINTABLE SHEET NUMBER RN | CARTRIDGE RESIDUAL RATE CR | INTERMEDIATE TANK RESIDUAL RATE SR |
|---|---|---|---|---|---|---|---|---|
| AAABBB | MDL_200 | IP_A | DOUBLE CHAMBER | 6000 | 400 | 3000 | 45 | 100 |
| CCCDDD | MDL_250 | IP_B | DOUBLE CHAMBER | 5000 | 500 | 3000 | 50 | 100 |
| GGGHHH | MDL_500 | IP_C | SINGLE CHAMBER | 5000 | — | 3500 | 100 | — |

EN1, EN2, EN3

FIG. 6 (A) PRINTER 100A (FIRST STORAGE STATE S1)
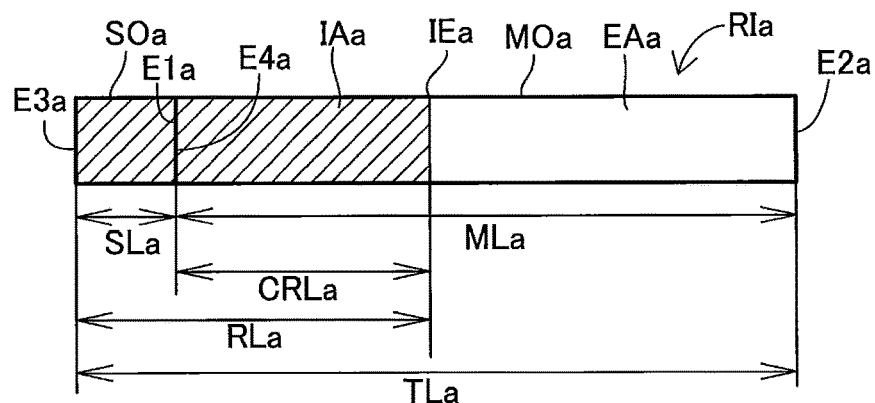
FIG. 6 (B) PRINTER 100A (SECOND STORAGE STATE S2)
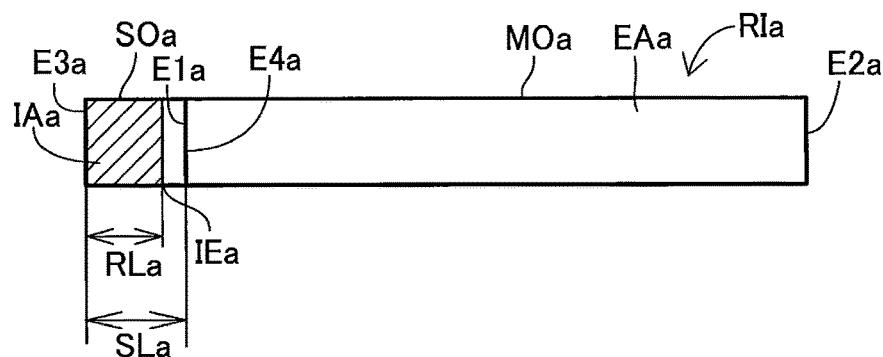
FIG. 6 (C) PRINTER 100B (FIRST STORAGE STATE S1)
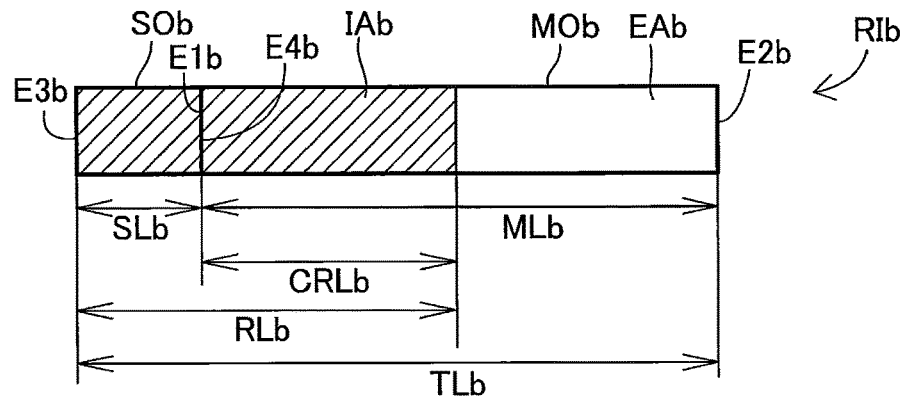
FIG. 6 (D) PRINTER 100C
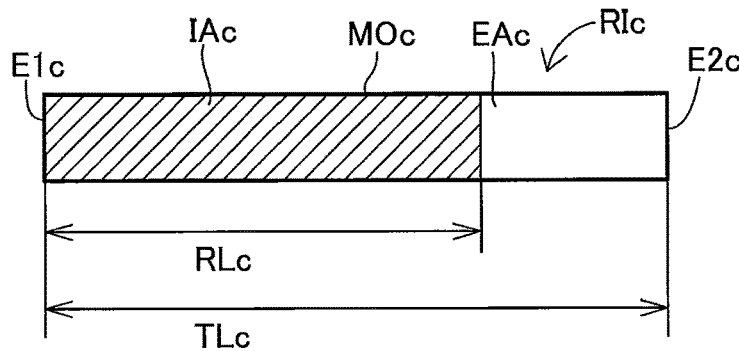

FIG. 7

| SERIAL NUMBER | MODEL NAME | RESIDUAL RATE OF INK |
|---|---|---|
| AAABBB | MDL_200 | |
| CCCDDD | MDL_250 | |
| GGGHHH | MDL_500 | |

MANAGEMENT LIST

INFORMATION PROCESSING APPARATUS GENERATING DISPLAY SCREEN DATA BASED ON INFORMATION ON RESIDUAL QUANTITY OF PRINTING AGENT

CROSS REFERENCE TO RELATED APPLICATION

This application is a continuation of U.S. patent application Ser. No. 16/356,050, filed Mar. 18, 2019, which further claims priority from Japanese Patent Application No. 2018-053424 filed Mar. 20, 2018. The entire content of both application are incorporated herein by reference.

TECHNICAL FIELD

The present disclosure relates to a display screen for displaying information about a cartridge used to supply a printing agent to a print execution device.

BACKGROUND

A conventional image-forming apparatus displays a display screen that includes gauges indicating the residual quantities of toner in small-capacity cartridges, and gauges indicating the residual quantities of toner in large-capacity cartridges. In this image-forming apparatus, the position on the gauge specifying when the small-capacity cartridge is empty is aligned with the position on the gauge specifying that the large-capacity cartridge is empty.

SUMMARY

However, the conventional technology described above does not give any consideration for the structures by which the cartridge is mounted and the printing agent (ink or toner, for example) is supplied to the print execution device. Consequently, depending on the structure for supplying the printing agent, it was not always easy using the conventional technology to fully grasp the index value for the residual quantity of printing agent in the cartridge (e.g., the residual quantity itself) via the display screen.

In view of the foregoing, it is an object of the present disclosure to provide a display screen that enables the user to more easily grasp the index value related to the residual quantity of printing agent in the cartridge.

In order to attain the above and other objects, the disclosure provides an information processing apparatus. The information processing apparatus includes a processor configured to perform: acquiring first information on a residual quantity of printing agent stored in a first cartridge mounted on a first supply portion, the first supply portion being a first type of supply portion including a first tank configured to store printing agent supplied from the first cartridge, the first supply portion being configured to supply the printing agent stored in the first tank to a first print execution device; acquiring second information on a residual quantity of printing agent stored in a second cartridge mounted on a second supply portion, the second supply portion being one of a second type of supply portion including a second tank and a third type of supply portion without any tank, the second tank configured to store printing agent supplied from the second cartridge and having a volume different from that of the first tank, the second supply portion being configured to supply the printing agent stored in the second cartridge to a second print execution device; generating display screen data representing a display screen including a first display image and a second display image, the first display image being for expressing a first index value based on the first information, the first index value concerning a residual quantity of the printing agent to be supplied to the first print execution device, the second display image being for expressing a second index value based on the second information, the second index value concerning a residual quantity of the printing agent to be supplied to the second print execution device; and outputting the display screen data. The first display image includes a first object and a second object. Positions in the first object indicate possible residual quantities of the printing agent to be supplied to the first print execution device in a first state where printing agent remains in both the first cartridge and the first tank. The positions in the first object has a first position corresponding to a possible minimum residual quantity of the printing agent in the first state. Positions in the second object indicate possible residual quantities of the printing agent to be supplied to the first print execution device in a second state where the printing agent does not remain in the first cartridge but remains in the first tank. The positions in the second object has a second position and a third position. The second position corresponds to a possible maximum residual quantity of the printing agent in the second state. The third position corresponds to a possible minimum residual quantity of the printing agent in the second state. The second display image includes a third object. Positions in the third object indicate possible residual quantities of the printing agent to be supplied to the second print execution device in a third state where the printing agent remains in the second cartridge. The positions in the third object has a fourth position corresponding to a possible minimum residual quantity of the printing agent in the third state. The first position, one of the second position and the third position, and the fourth position are aligned at a reference position.

According to another aspect, the disclosure provides a non-transitory computer readable storage medium storing a set of program instructions for an information processing apparatus including a processor. The set of program instructions includes: acquiring first information on a residual quantity of printing agent stored in a first cartridge mounted on a first supply portion, the first supply portion being a first type of supply portion including a first tank configured to store printing agent supplied from the first cartridge, the first supply portion being configured to supply the printing agent stored in the first tank to a first print execution device; acquiring second information on a residual quantity of printing agent stored in a second cartridge mounted on a second supply portion, the second supply portion being one of a second type of supply portion including a second tank and a third type of supply portion without any tank, the second tank configured to store printing agent supplied from the second cartridge and having a volume different from that of the first tank, the second supply portion being configured to supply the printing agent stored in the second cartridge to a second print execution device; generating display screen data representing a display screen including a first display image and a second display image, the first display image being for expressing a first index value based on the first information, the first index value concerning a residual quantity of the printing agent to be supplied to the first print execution device, the second display image being for expressing a second index value based on the second information, the second index value concerning a residual quantity of the printing agent to be supplied to the second print execution device; and outputting the display screen data. The first display image includes a first object and a second object. Positions in the first object indicate possible residual quantities of the printing agent to be supplied to the first print execution device in a first state where printing agent remains in both the first cartridge and the first tank. The positions in the first object has a first position corresponding to a possible minimum residual quantity of the printing agent in the first state. Positions in the second object indicate possible residual quantities of the printing agent to be supplied to the first print execution device in a second state where the printing agent does not remain in the first cartridge but remains in the first tank. The positions in the second object has a second position and a third position. The second position corresponds to a possible maximum residual quantity of the printing agent in the second state. The third position corresponds to a possible minimum residual quantity of the printing agent in the second state. The second display image includes a third object. Positions in the third object indicate possible residual quantities of the printing agent to be supplied to the second print execution device in a third state where the printing agent remains in the second cartridge. The positions in the third object has a fourth position corresponding to a possible minimum residual quantity of the printing agent in the third state. The first position, one of the second position and the third position, and the fourth position are aligned at a reference position.

BRIEF DESCRIPTION OF THE DRAWINGS

The particular features and advantages of the disclosure as well as other objects will become apparent from the following description taken in connection with the accompanying drawings, in which:

FIG. 4 is a table illustrating an example of a management database according to the embodiment;

FIG. 6(A) is an explanatory diagram illustrating residual rate display image for a printer having the double-chamber supply method when the storage state is the first storage state;

FIG. 6(B) is an explanatory diagram illustrating residual rate display image for the printer having the double-chamber supply method when the ink supply portion is in the second storage state;

FIG. 6(C) is an explanatory diagram illustrating residual rate display image for another printer having a double-chamber supply method when an ink supply portion of another printer is in a first storage state;

FIG. 6(D) is an explanatory diagram illustrating residual rate display image for a printer having the single-chamber supply method;

FIG. 7 is an explanatory diagram illustrating an example of a management list according to the embodiment;

DETAILED DESCRIPTION

A. First Embodiment

A-1. Structure of a System 1000

Figure 1:
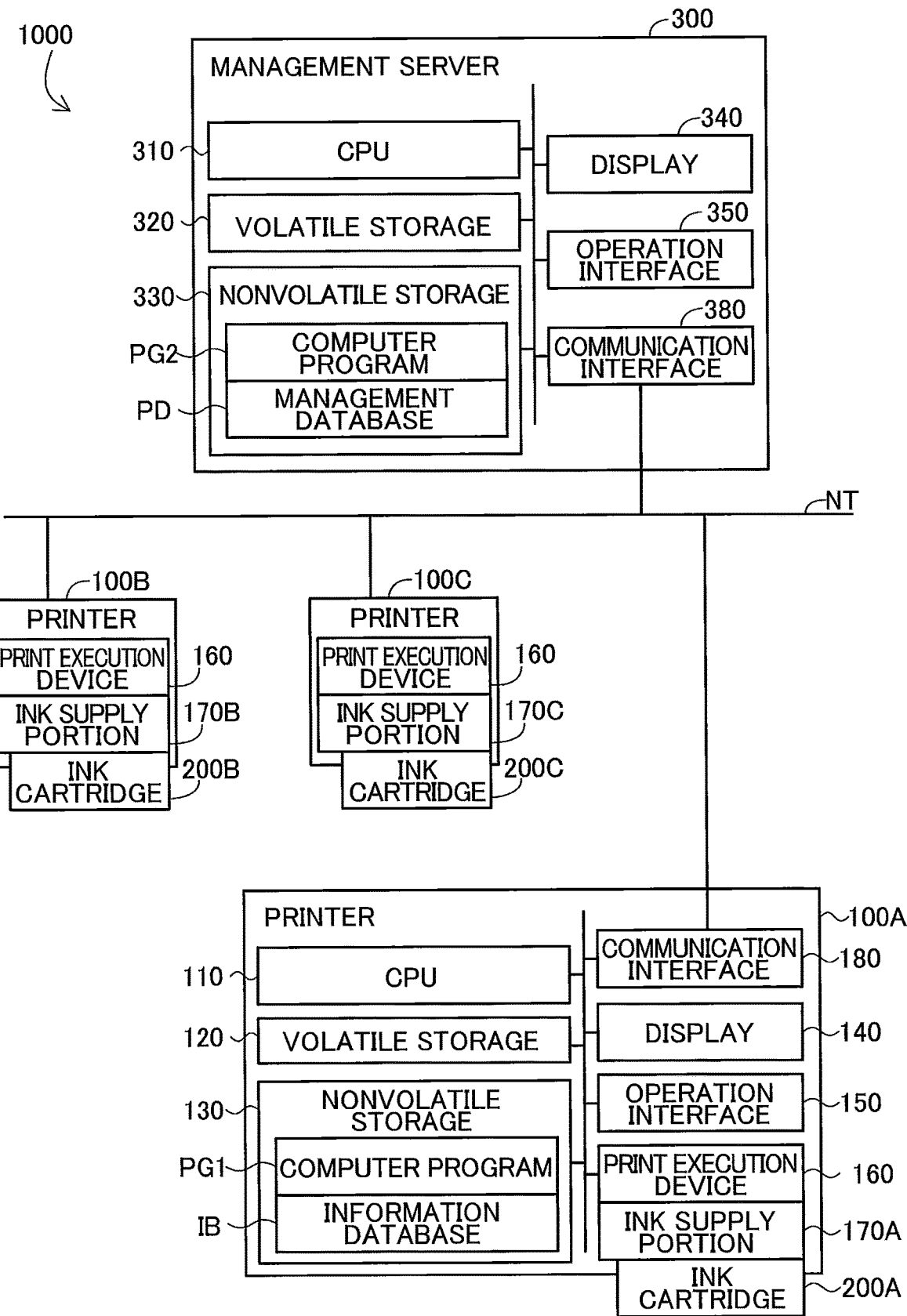
FIG. 1 is a block diagram showing a structure of a system according to an embodiment.

FIG. 1 is a block diagram showing the structure of a system 1000. The system 1000 is provided with printers 100A, 100B, and 100C, and a management server 300 constituting the information processing apparatus of the embodiment. The printers 100A, 100B, and 100C and the management server 300 are connected to a local area network NT and can communicate with each other over the local area network NT.

The printer 100A includes a CPU 110 constituting the controller of the printer 100A; a volatile storage 120, such as DRAM; a nonvolatile storage 130, such as a hard disk drive or flash memory; a display 140, such as a liquid crystal display that displays images; an operation interface 150, such as a touchscreen and buttons designed to acquire operations performed by the user; a print execution device 160; an ink supply portion 170A; and a communication interface 180.

The communication interface 180 is configured to be in connection with the local area network NT. Specifically, the communication interface 180 is a wired interface conforming to Ethernet (registered trademark), or a wireless interface conforming to the Wi-Fi technology (based on the IEEE (Institute of Electrical and Electronics Engineers, Inc.) 802.11 standard or a standard based on this standard, such as one of the versions 802.11a, 11b, 11g, and 11n).

The CPU 110 is a processor that performs data processing. The volatile storage 120 provides a buffer region that temporarily stores various intermediate data generated when the CPU 110 performs processes. The nonvolatile storage 130 stores a computer program PG1 for controlling the printer, and an information database IB described later.

In the embodiment, the computer program PG1 may be pre-stored in the nonvolatile storage 130 when the printer 100A is manufactured. Alternatively, the computer program PG1 may be made available through download from a server connected to the printer 100A over the internet, or may be provided in a recorded format, such as on a CD-ROM.

By executing the computer program PG1, the CPU 110 executes a printing process for controlling the print execution device 160 to print images. Also, by executing the computer program PG1, the CPU 110 transmits to the management server 300 various printing information, which is related to the printer 100A and is stored in the information database IB, in response to a request from the management server 300.

The print execution device 160 executes printing operations under the control of the CPU 110. The ink supply portion 170A supplies ink Ik as the printing agent to the print execution device 160. FIGS. 2(A) and 2(B) are schematic diagrams showing the structures of the print execution device 160 and the ink supply portion 170A.

The print execution device 160 is an inkjet-type printing mechanism that prints images on a paper constituting the printing medium using ink supplied from an ink cartridge 200A as the printing agent. Specifically, the print execution device 160 forms images on a paper by ejecting ink onto the paper from nozzles formed in a print head (not shown) to form dots on the paper. In the embodiment, the print execution device 160 is a monochromatic printing mechanism using a single color of ink Ik (black (K), for example).

As shown in FIGS. 2(A) and 2(B), the ink supply portion 170A is provided with a mount portion 172A, an ink supply opening 174A, an intermediate tank 175A, and an ink channel section 177A. The ink cartridge 200A is mounted on the mount portion 172A.

Formed in the ink cartridge 200A are a main storage chamber 210A for accommodating ink Ik, an air hole 220A, and an ink outlet 230A. The air hole 220A is an opening providing communication between the main storage chamber 210A and the external air. The ink outlet 230A is an opening through which the ink Ik is supplied from the main storage chamber 210A to the ink supply portion 170A. The ink outlet 230A is provided near the bottom of the main storage chamber 210A so as to be capable of supplying all of the ink Ik in the main storage chamber 210A into the ink supply portion 170A.

An integrated circuit (hereinafter called a "chip") 250A is mounted on the outer surface of the ink cartridge 200A. The chip 250A has a memory for storing various information about the ink cartridge 200A. The information stored in the memory of the chip 250A in the embodiment includes total printable sheet number TN and identification information (a serial number, for example) identifying the ink cartridge 200A. The total printable sheet number TN specifies the number of sheets that can be printed using ink Ik of the quantity accommodated in a new ink cartridge 200A (initial quantity). Hence, the total printable sheet number TN may be considered a value specifying the initial quantity of ink Ik in the ink cartridge 200A in units of printing sheets. The total printable sheet number TN may be set to a value obtained by dividing the initial quantity of ink Ik in the ink cartridge 200A by the average quantity of ink used for printing one sheet, for example.

The mount portion 172A is a holder, for example, in which the ink cartridge 200A is detachably mountable. The ink supply opening 174A is in connection with the ink outlet 230A of the ink cartridge 200A mounted in the mount portion 172A, and the intermediate tank 175A communicates with the main storage chamber 210A via the ink supply opening 174A and the ink outlet 230A. The ink Ik in the main storage chamber 210A is supplied into the ink supply portion 170A through the ink supply opening 174A. The mount portion 172A has a contact CM that contacts an electrode on the chip 250A of the ink cartridge 200A when the ink cartridge 200A is mounted in the mount portion 172A. The printer 100A (the CPU 110) can read information stored in the memory of the chip 250A or write information to the memory through the contact CM.

An auxiliary storage chamber 179A for accommodating the ink Ik and an air hole 178A are formed in the intermediate tank 175A. The air hole 178A is an opening providing communication between the auxiliary storage chamber 179A and the external air. The auxiliary storage chamber 179A communicates with the main storage chamber 210A mounted in the mount portion 172A via the ink supply opening 174A, and stores ink supplied from the ink cartridge 200A through the ink supply opening 174A.

Hereinafter, "upstream" and "downstream" are used with respect to an ink supply direction from the ink cartridge 200A to the print execution device 160. The upstream end of the ink channel section 177A is connected to the auxiliary storage chamber 179A of the intermediate tank 175A near the bottom surface thereof and is in communication with the auxiliary storage chamber 179A. The downstream end of the ink channel section 177A is connected to the print head (not shown) of the print execution device 160. With this configuration, ink Ik in the auxiliary storage chamber 179A is supplied to the print execution device 160 through the ink channel section 177A.

As is clear from the above description, the intermediate tank 175A is disposed along the path of ink Ik flowing from the ink cartridge 200A mounted in the mount portion 172A to the print execution device 160.

This type of ink supply method that provides an intermediate tank along the path of the ink Ik leading from the ink cartridge to the print execution device 160, as in the ink supply portion 170A of the printer 100A, will be called a double-chamber supply method. FIG. 2(A) depicts the ink supply portion 170A when a state of stored ink Ik (hereinafter, referred to the storage state) is a first storage state S1, while FIG. 2(B) depicts the ink supply portion 170A when the storage state is a second storage state S2. In the first storage state S1, ink Ik remains in the ink cartridge 200A (in the main storage chamber 210A) and in the intermediate tank 175A (in the auxiliary storage chamber 179A). In the second storage state S2, ink Ik remains in the intermediate tank 175A (the auxiliary storage chamber 179A), but no longer remains in the ink cartridge 200A (the main storage chamber 210A).

The main storage chamber 210A in the ink cartridge 200A communicates with the atmosphere through the air hole 220A, while the auxiliary storage chamber 179A in the intermediate tank 175A communicates with the atmosphere through the air hole 178A. The auxiliary storage chamber 179A of the intermediate tank 175A includes a section positioned lower (below in FIG. 2) than the bottom of the main storage chamber 210A (the lower end of the main storage chamber 210A in the vertical direction) formed in the ink cartridge 200A, and a section positioned higher than the bottom of the main storage chamber 210A in the vertical direction. Thus, when a new ink cartridge 200A is mounted in the mount portion 172A, some of the ink Ik in the ink cartridge 200A transfers from the main storage chamber 210A into the auxiliary storage chamber 179A through the ink supply opening 174A. Consequently, the level ISm of ink Ik in the main storage chamber 210A and the level ISs of ink Ik in the auxiliary storage chamber 179A are adjusted to the same height (see FIG. 2(A)).

As ink Ik is consumed through printing by the print execution device 160, the levels ISm and ISs drop while remaining at the same level as each other. Once the levels ISm and ISs reach a vertical position EL corresponding to the bottom of the main storage chamber 210A (hereinafter called an "empty level EL"), ink Ik no longer remains in the main storage chamber 210A. Hence, the storage state shifts from the first storage state S1 in FIG. 2(A) to the second storage state S2 in FIG. 2(B). Here, the state in which ink Ik no longer remains in the main storage chamber 210A of the ink cartridge 200A signifies that ink Ik no longer transfers from the main storage chamber 210A into the auxiliary storage chamber 179A and includes a state in which some ink Ik remains deposited on the inner walls of the main storage chamber 210A.

The print execution device 160 can continue to print even after the storage state of ink Ik has shifted to the second storage state S2, in a case where ink Ik remains in the auxiliary storage chamber 179A. If the ink cartridge 200A is replaced with a new ink cartridge after the storage state has shifted to the second storage state S2, ink Ik will not be wasted since no ink Ik remains in the old ink cartridge 200A being replaced. Hence, the double-chamber supply method is advantageous in that the ink cartridge 200A can be replaced while printing is still possible, without wasting any ink Ik.

In the double-chamber supply method, a liquid level sensor (not shown) is provided in the intermediate tank 175A for detecting when the level ISs of ink Ik in the auxiliary storage chamber 179A has reached the empty level EL. With this arrangement, the CPU 110 can detect whether ink Ik remains in the ink cartridge 200A. The liquid level sensor may be configured with a float having a smaller specific gravity than that of the ink Ik. With this configuration, the position of the float moves downward after the level ISs reaches the empty level EL, making it possible to detect when the level ISs has reached the empty level EL by detecting movement of the float. In other words, the liquid level sensor detects whether the storage state of ink is the first storage state S1 or the second storage state S2. Other methods known in the art may be employed as the liquid level sensor, such as a method of measuring the electrical resistance of the ink Ik. The ink cartridge 200A need not be provided with a liquid level sensor when using the double-chamber supply method. Accordingly, the double-chamber supply method is also advantageous in that the structure of the ink cartridge 200A can be simplified.

The ink volume corresponding to the boundary between the first storage state S1 and the second storage state S2 will be called a boundary ink volume. The boundary ink volume in the embodiment may be considered the volume of ink in the auxiliary storage chamber 179A when the level ISs in the auxiliary storage chamber 179A has dropped to the empty level EL. The boundary ink volume may also be considered the maximum ink volume in the second storage state S2. Further, the boundary ink volume is equivalent to the capacity of the section of the auxiliary storage chamber 179A positioned below the bottom of the main storage chamber 210A. The number of sheets that can be printed using ink Ik of the boundary ink volume, i.e., the number of sheets that can be printed using the remaining ink Ik in the intermediate tank 175A at a time when the storage state shifts from the first storage state S1 to the second storage state S2 will be called a tank printable sheet number SN. The tank printable sheet number SN may be thought of as a value specifying the boundary ink volume in units of sheets. The boundary ink volume and the tank printable sheet number SN are values dependent on the structure and size of the intermediate tank 175A and are specific to each model of printer.

The information database IB stores printer information related to the printer 100A. The printer information includes information specifying the serial number and model name, for example. The printer information further includes ink information regarding the ink Ik, and history information about the printing history, for example. The ink information may include the total printable sheet number TN and the tank printable sheet number SN described above, as well as a remaining printable sheet number RN. The total printable sheet number TN may be acquired from the memory on the chip 250A of the ink cartridge 200A, for example. The remaining printable sheet number RN is the number of sheets that can be printed using the ink Ik that remains in the ink cartridge 200A and the intermediate tank 175A. The remaining printable sheet number RN is calculated by subtracting from the total printable sheet number TN the accumulated number of printed sheets since the ink cartridge 200A was last replaced. When the ink cartridge 200A is replaced with new one, the CPU 110 updates the total printable sheet number TN in the information database IB to a value of a total printable sheet number TN transmitted from the new ink cartridge 200A. When the ink cartridge 200A is replaced with new one, the CPU 110 may set the total printable sheet number TN in the information database IB to a sum of the value of the total printable sheet number TN transmitted from the new ink cartridge 200A and a current value of the remaining printable sheet number RN stored in the information database IB.

The printer 100A (the CPU 110) maintains the printing information in the information database IB at the latest information by updating the history information and the ink information stored in the information database IB each time a printing operation is executed, for example. That is, the remaining printable sheet number RN stored in the information database IB may be updated each time the printer 100A executes a printing operation.

The printer 100B is provided with an ink supply portion 170B (see FIG. 1) that differs from the ink supply portion 170A of the printer 100A. The remaining structure of the printer 100B is identical to that of the printer 100A. As with the ink supply portion 170A, the ink supply portion 170B employs a double-chamber supply method (not shown) that provides an intermediate tank along the path of ink Ik flowing from the ink cartridge to the print execution device 160. However, the capacity of the intermediate tank (auxiliary storage chamber) in the ink supply portion 170B differs from the capacity of the intermediate tank 175A in the ink supply portion 170A and, hence, the tank printable sheet number SN of the printer 100B differs from the tank printable sheet number SN of the printer 100A. Further, an ink cartridge 200B (see FIG. 1) mounted in the ink supply portion 170B has a different initial volume of ink Ik from the initial volume of ink Ik in the ink cartridge 200A. Consequently, the total printable sheet number TN of the ink cartridge 200B differs from the total printable sheet number TN of the ink cartridge 200A.

The printer 100C is provided with an ink supply portion 170C that differs from the ink supply portion 170A of the printer 100A. The remaining structure of the printer 100C is identical to that of the printer 100A. The ink supply portion 170C employs a single-chamber supply method that does not provide an intermediate tank along the path of the ink Ik flowing from an ink cartridge 200C to the print execution device 160.

FIGS. 3(A) and 3(B) are schematic diagrams showing the structures of the print execution device 160 and the ink supply portion 170C of the printer 100C. The ink supply portion 170C is provided with the inkjet-type print execution device 160 similar to the print execution device 160 of the printer 100A, a mount portion 172C, an ink supply opening 174C, and an ink channel section 177C.

As with the ink cartridge 200A, the ink cartridge 200C has a storage chamber 210C that accommodates ink Ik, an air hole 220C that provides communication between the storage chamber 210C and the external air, and an ink outlet 230C through which ink Ik is supplied to the ink supply portion 170C. As with the ink cartridge 200A, a chip 250C is mounted on the outer surface of the ink cartridge 200C.

The mount portion 172C is a holder, for example, in which the ink cartridge 200C is detachably mountable. The ink supply opening 174C communicates with the ink outlet 230C in the ink cartridge 200C mounted in the mount portion 172C. The upstream end of the ink channel section 177C communicates with the storage chamber 210C via the ink supply opening 174C, while the downstream end is connected to a print head (not shown) in the print execution device 160C. With this configuration, ink Ik in the ink cartridge 200C (the storage chamber 210C) is supplied to the print execution device 160C through the ink channel section 177C.

With the single-chamber supply method, a liquid level sensor (not shown) is provided in the ink cartridge 200C for detecting whether a level IS of ink Ik in the storage chamber 210C has reached an empty level ELc.

Since the single-chamber supply method does not include the intermediate tank provided in the double-chamber supply method, the print execution device 160 becomes unable to print prior to the ink cartridge 200C running out of ink Ik. Specifically, the problem of air becoming mixed in with ink Ik supplied to the print execution device 160 may occur when the residual quantity of ink Ik in the ink cartridge 200C is slight. Therefore, printing with the print execution device 160 must be halted before the ink Ik remaining in the ink cartridge 200C is insufficient to prevent air from entering the ink.

Figure 2:
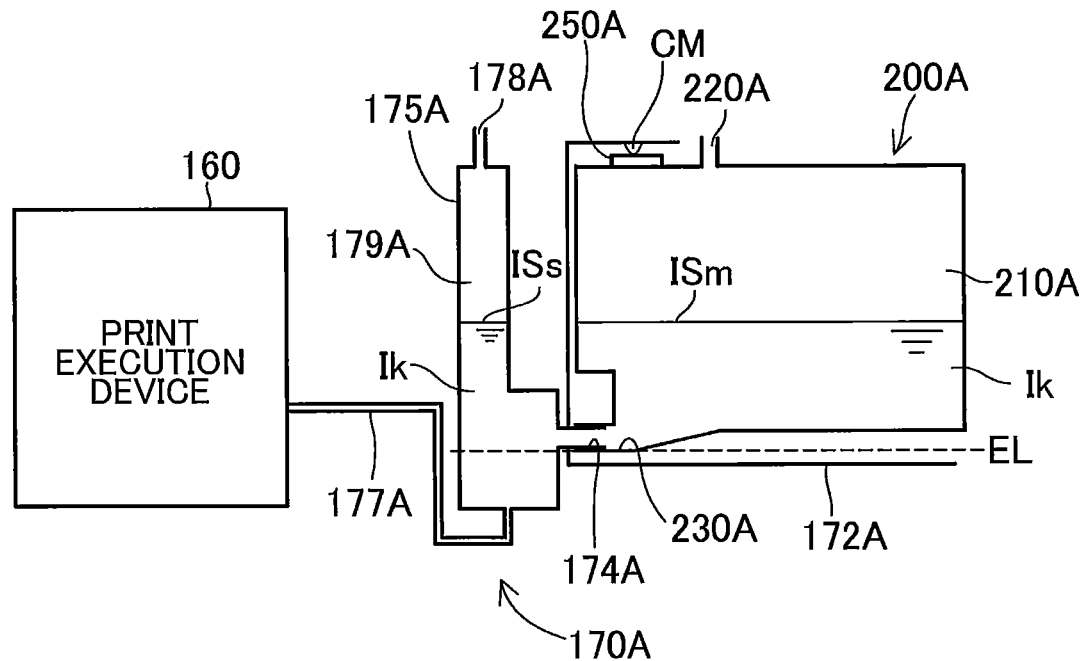
FIG. 2(A) is a schematic diagram showing structures of a print execution device and an ink supply portion having a double-chamber supply method when a storage state of ink is a first storage state.
FIG. 2(B) is a schematic diagram showing structures of the print execution device and the ink supply portion having the double-chamber supply method when the storage state is a second storage state.
Figure 2:
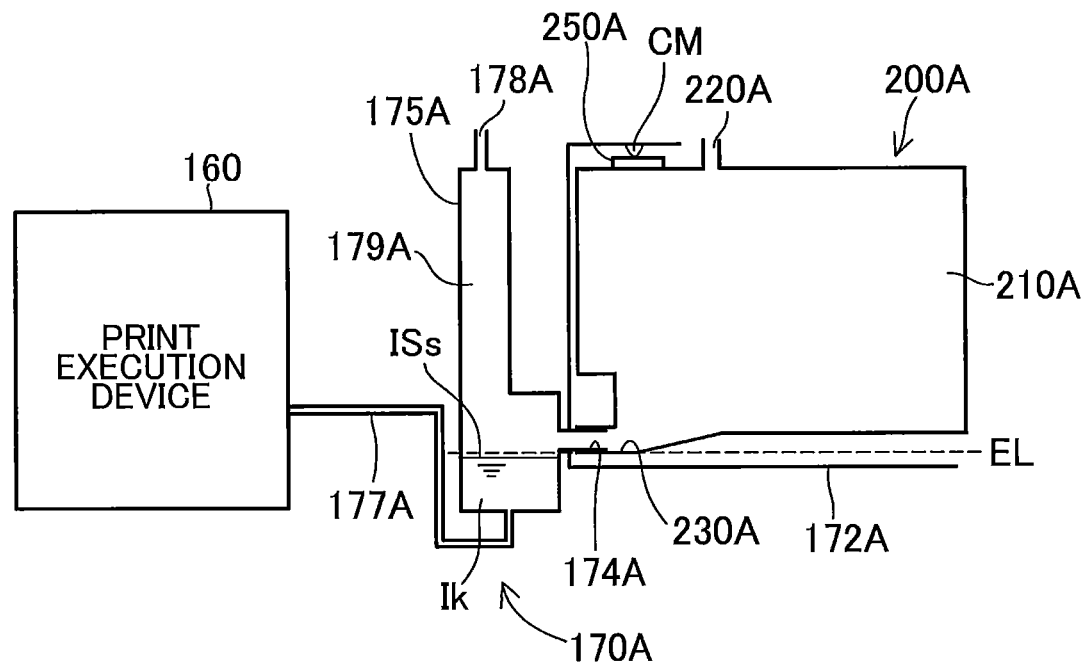
Figure 3:
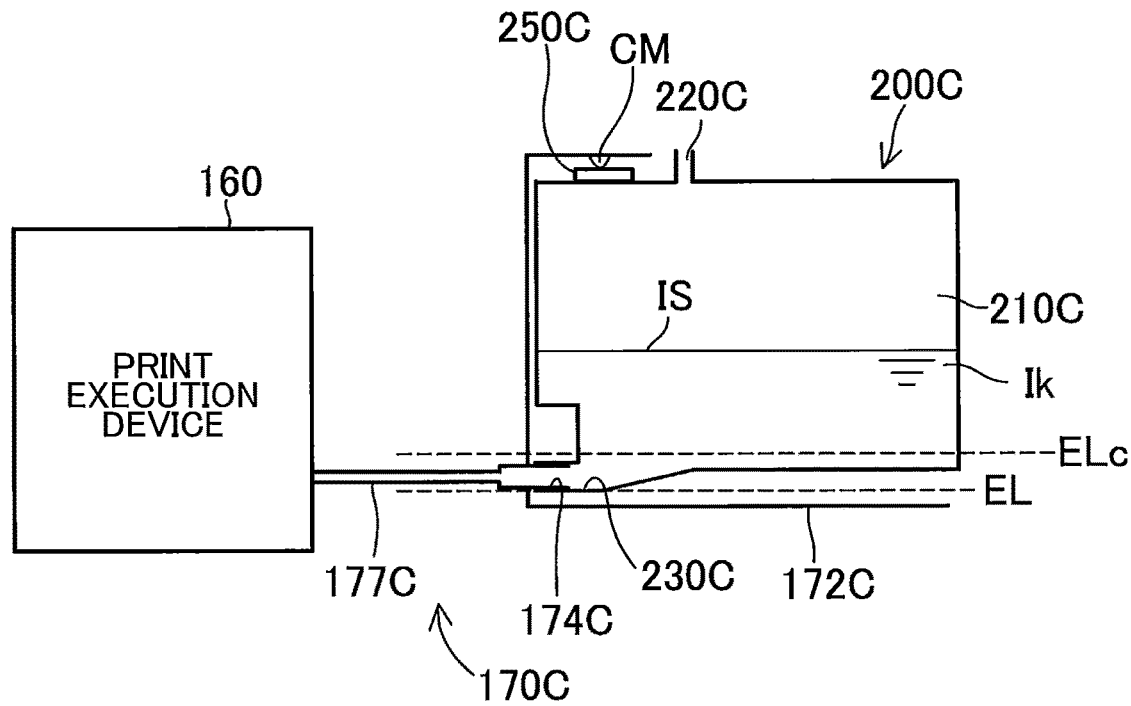
FIGS. 3(A) and 3(B) are schematic diagrams showing structures of a print execution device and an ink supply portion having a single-chamber supply method.
Figure 3:
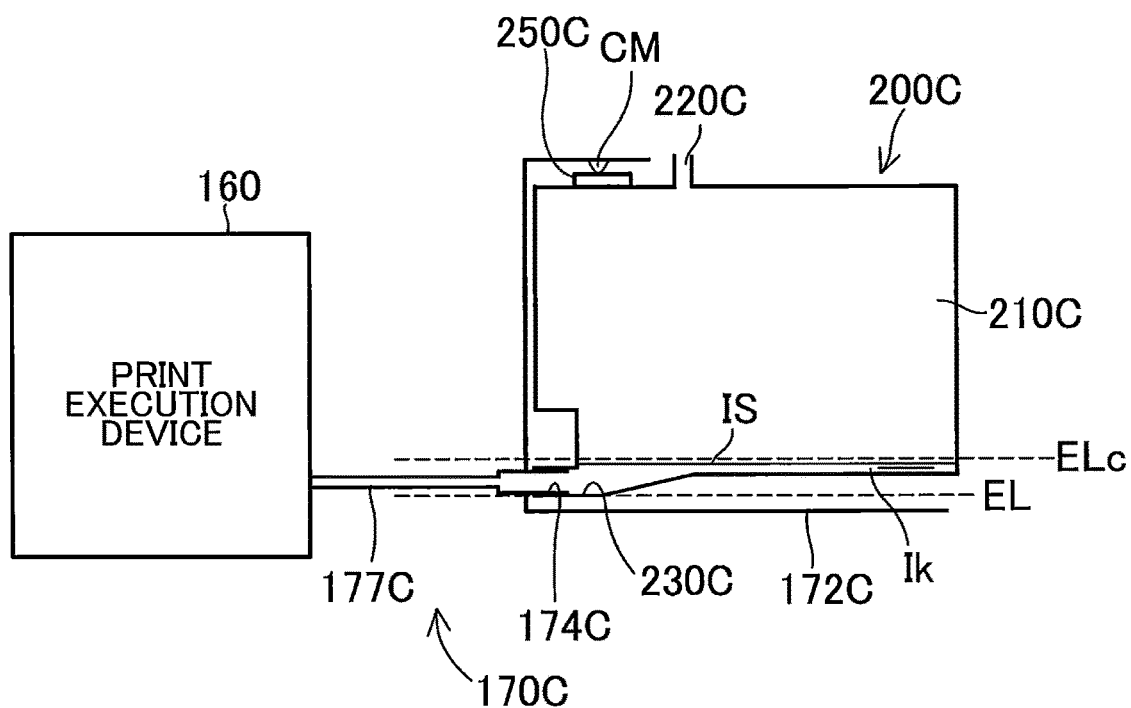

Therefore, in the single-chamber supply method the empty level ELc (see FIG. 3(A)) is set above the empty level EL (see FIGS. 2 and 3) in the ink cartridge 200A. Specifically, a vertical length between the empty level ELc and the bottom of the main storage chamber 210C is longer than a vertical length between the empty level EL and the bottom of the main storage chamber 210A. FIG. 3(B) shows the state of stored ink when the level IS of ink Ik in the ink cartridge 200C has reached the empty level ELc. In this state, a small quantity of ink Ik remains in the ink cartridge 200C (the storage chamber 210C). When using the single-chamber supply method, the ink cartridge 200C is replaced after the level IS of ink Ik in the ink cartridge 200C has reached the empty level ELc.

The management server 300 is a computer owned by the administrator of the printers 100A, 100B, and 100C. The management server 300 is provided with a CPU 310 serving as the controller of the management server 300; a volatile storage 320, such as DRAM; a nonvolatile storage 330, such as a hard disk drive or flash memory; a display 340, such as a liquid crystal display that displays images; an operation interface 350, such as a keyboard and mouse; and a communication interface 380.

The communication interface 380 is connected to the local area network NT. As with the communication interface 180 of the printer 100A, the communication interface 380 is a wired interface conforming with Ethernet (registered trademark), or a wireless interface conforming with Wi-Fi technology or a standard based on the Wi-Fi technology.

The CPU 310 is a processor that performs data processes. The volatile storage 320 provides a buffer region for temporarily storing various intermediate data generated when the CPU 310 performs processes. The nonvolatile storage 330 stores a computer program PG2, and a management database PD.

The computer program PG2 is an application program provided in a downloadable format from a vendor server. Here, the vendor server is a server provided by the company that manages the system 1000 or the vendor that manufactures the printers 100A, 100B, and 100C. Alternatively, the computer program PG2 may be provided in a recorded format, such as on a CD-ROM, or may be pre-stored in the nonvolatile storage 330 when the management server 300 is manufactured.

By executing the computer program PG2, the management server 300 (the CPU 310) can execute processes described later related to management of the printers 100A, 100B, and 100C in the system 1000, such as an image data generating process.

The management database PD records device information collected by the management server 300. FIG. 4 shows an example of the management database PD according to the embodiment. As shown in FIG. 4, the management database PD includes entries EN1, EN2, and EN3 corresponding to the printers 100A, 100B, and 100C under management.

The entry EN1 corresponds to the printer 100A, and includes a plurality of printer information items for the printer 100A, and specifically a serial number, a model name, an IP address, and ink-related information for the ink Ik. In this example, the ink-related information includes information on the supply method of the ink Ik, total printable sheet number TN, tank printable sheet number SN, and remaining printable sheet number RN described above, as well as a cartridge residual rate CR and an intermediate tank residual rate SR.

The serial number is identification information used to identify the printer 100A. The model name specifies the model of the printer 100A. The IP address is an address that has been assigned to the printer 100A.

The cartridge residual rate CR indicates the percentage (in units of %) of ink Ik remaining in the ink cartridge 200A. In the structure shown in FIG. 2(A), ink Ik in the intermediate tank 175A remains at a level above the empty level EL when ink remains in the ink cartridge 200A, but this portion of ink above the empty level EL is treated as part of the residual ink Ik in the ink cartridge 200A. This is because expressing the ink Ik present in the intermediate tank 175A as the quantity of ink Ik that can be consumed after the ink Ik in the ink cartridge 200A reaches zero (i.e., after the storage state shifts from the first storage state S1 to the second storage state S2) is a meaningful guide for replacing the ink cartridge. Therefore, for the printer 100A employing a double-chamber supply method, the cartridge residual rate CR is calculated according to equation (1) below using the total printable sheet number TN, the tank printable sheet number SN (the number of printable sheets after ink Ik in the ink cartridge 200A reaches zero), and the remaining printable sheet number RN.

$$CR = 100 \times (RN-SN)/(TN-SN) \text{ when } RN>SN$$

$$CR = 0 \text{ when } RN \leq SN \qquad (1)$$

When the remaining printable sheet number RN is greater than the tank printable sheet number SN (i.e., when RN>SN), the state of the stored ink Ik is in the first storage state S1, indicating that ink Ik remains in the ink cartridge 200A. The numerator (RN−SN) specifies the number of sheets that can be printed using the remaining ink Ik in the ink cartridge 200A (including ink Ik in the intermediate tank 175A positioned above the empty level EL). The denominator (TN−SN) indicates the number of sheets that can be printed using ink Ik present in the ink cartridge 200A at the moment the new ink cartridge 200A was mounted (including ink Ik in the intermediate tank 175A positioned above the empty level EL). When the remaining printable sheet number RN is less than or equal to the tank printable sheet number SN (RN≤SN), the state of stored ink Ik is in the second storage state S2 described above, indicating that ink Ik no longer remains in the ink cartridge 200A. Accordingly, the cartridge residual rate CR is 0 when RN≤SN.

In the configuration shown in FIG. 2, the intermediate tank residual rate SR is the percentage (in units of %) of ink Ik present in the section of the intermediate tank 175A below the empty level EL. The intermediate tank residual rate SR is calculated according to equation (2) below using the tank printable sheet number SN and the remaining printable sheet number RN.

$$SR=100 \text{ when } RN>SN$$

$$SR=100\times RN/SN \text{ when } RN\leq SN \qquad (2)$$

When the remaining printable sheet number RN is greater than the tank printable sheet number SN (i.e., when RN>SN), the state of stored ink Ik is in the first storage state S1 described above, indicating that ink Ik remains in the ink cartridge 200A. Hence, the intermediate tank residual rate SR is set to 100%. When the remaining printable sheet number RN is less than or equal to the tank printable sheet number SN (i.e., RN≤SN), the state of stored ink Ik is in the second storage state S2 described above, indicating that ink remains only in the intermediate tank 175A.

As described above, the cartridge residual rate CR and the intermediate tank residual rate SR are two specific index values specifying the residual rate of ink Ik to be supplied to the printer 100A in which the ink cartridge 200A is mounted.

The entries EN2 and EN3 for the printer 100B and printer 100C, respectively, include information for the same items that are included in the entry EN1 for the printer 100A. However, the printer 100C employs a single-chamber supply method and is not provided with an intermediate tank. Accordingly, the entry EN3 does not include a tank printable sheet number SN and the intermediate tank residual rate SR. For the printer 100C that employs a single-chamber supply method, the cartridge residual rate CR is calculated according to equation (3) below using the total printable sheet number TN and remaining printable sheet number RN.

$$CR=100\times RN/TN \qquad (3)$$

Of the printer information recorded in the management database PD in the embodiment, the serial number, the model name, and the IP address for each printer are acquired by the management server 300 when operations of the system 1000 are initiated, for example. In the embodiment, Simple Network Management Protocol (SNMP) is used for acquiring this information. Specifically, the management server 300 broadcasts an SNMP request over the local area network NT to search for printers on the local area network NT. The printers 100A, 100B, and 100C issue responses to the SNMP request that include their own IP address. The management server 300 then uses each IP address received in response to the SNMP request to transmit an individual SNMP request to each of the printers 100A, 100B, and 100C requesting the transmission of their serial number and model name, and receives the serial number and model name for each of the printers 100A, 100B, and 100C in response to the corresponding SNMP request. The management server 300 then records the corresponding serial number, model name, and IP address in the management database PD, thereby registering the printers 100A, 100B, and 100C as printers under management.

Of the printer information recorded in the management database PD, the supply method of the ink Ik, the total printable sheet number TN, the tank printable sheet number SN, and the remaining printable sheet number RN are acquired from the printers 100A, 100B, and 100C under management in the image data generating process described later. The management server 300 calculates the cartridge residual rate CR and the intermediate tank residual rate SR and records this information in the management database PD in the image data generating process.

A-2. Operations of the System 1000

A-2-1. Image Data Generating Process

Figure 5:
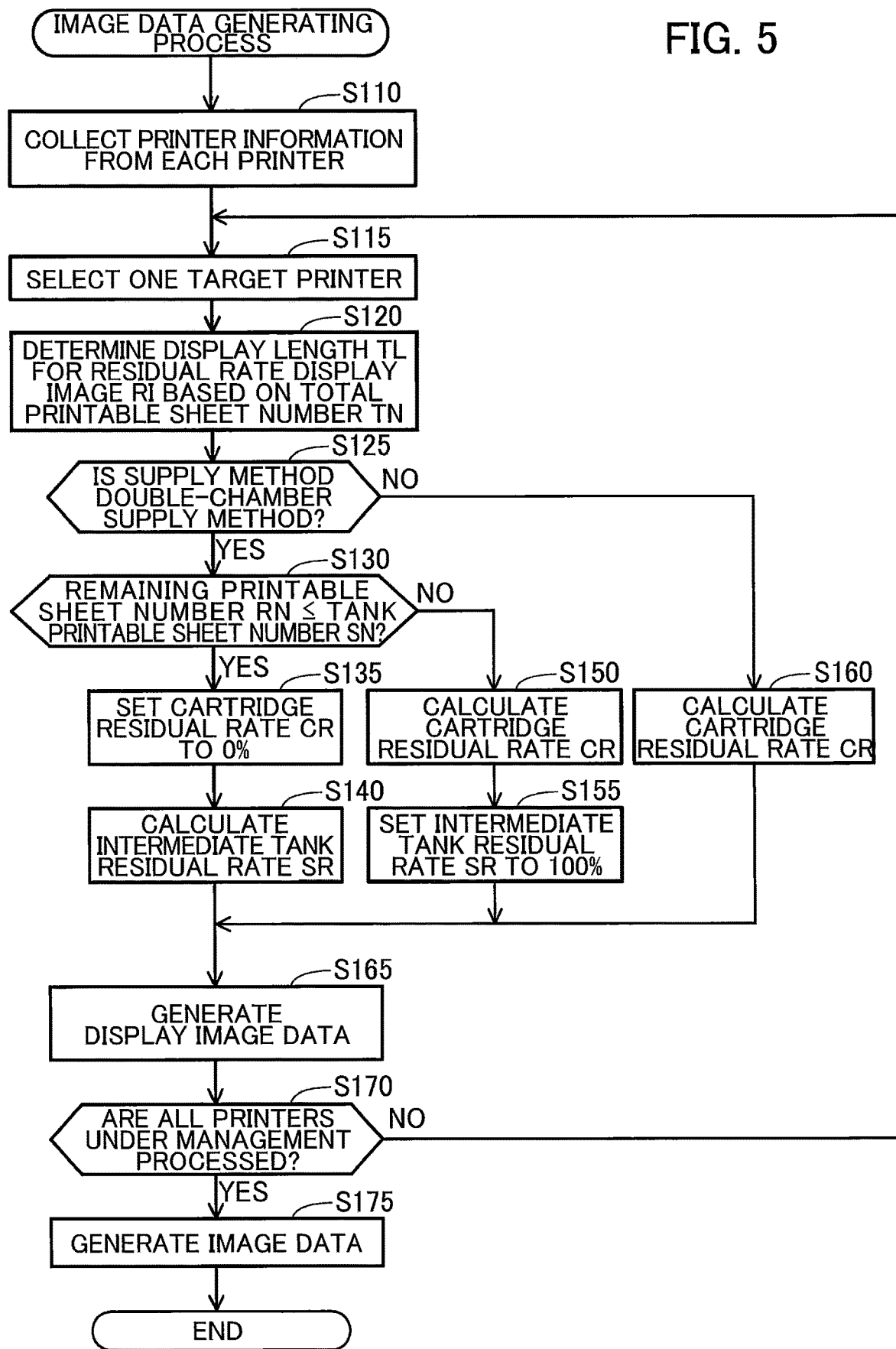
FIG. 5 is a flowchart illustrating an image data generating process.

The management server 300 (the CPU 310) executes an image data generating process periodically, such as at predetermined times with a frequency of one to multiple times per day. The image data generating process is performed to generate image data for displaying a management list MLT that includes printer information for the printers under management. In the embodiment, the printers under management are the printers 100A, 100B, and 100C. FIG. 5 is a flowchart illustrating steps in the image data generating process.

In S110 of FIG. 5, the management server 300 collects printer information from each of the printers 100A, 100B, and 100C under management. In the embodiment, the management server 300 collects printer information using SNMP. Specifically, the management server 300 transmits a SNMP request to each of the printers 100A, 100B, and 100C requesting desired items of the printer information. The management server 300 subsequently receives this printer information from each of the printers 100A, 100B, and 100C in response to the SNMP request. The management server 300 records the printer information collected from the target printers in the management database PD. The information collected from each printer includes the supply method of the ink Ik, the total printable sheet number TN, the tank printable sheet number SN, and the remaining printable sheet number RN described above.

In S115 the management server 300 selects one target printer from among the printers 100A, 100B, and 100C under management.

In S120 the management server 300 determines a display length TL for a residual rate display image RI based on the total printable sheet number TN. FIGS. 6(A)-6(D) show examples of residual rate display images RI. The residual rate display image RI functions to display the rate (percentage) of residual ink Ik (the cartridge residual rate CR and the intermediate tank residual rate SR) in the printers under management. For example, a residual rate display image Ma in FIG. 6(A) is the residual rate display image RI for the printer 100A, which employs a double-chamber supply method. In the embodiment, the residual rate display image RI is a band-like image elongated in the left-right direction. The display length TL of the residual rate display image RI is the longitudinal length of the same. As an example, the display length TL is calculated according to the following equation (4).

$$TL=(TN/TN\text{max})\times TL\text{max} \qquad (4)$$

Here, TNmax is the largest total printable sheet number TN among the printers 100A, 100B, and 100C under management, and TLmax is the largest display length that can be set. TLmax is a value based on the size of the display area for the residual rate display images RI. Thus, in the embodiment the display length TL for the residual rate display image RI of each printer is set based on the total printable sheet numbers TN of the printers 100A, 100B, and 100C under management. Consequently, the display length of the residual rate display image RI (i.e., the longitudinal lengths of the main object and the sub object described later) can be set appropriately, making it possible to provide a management list MLT that includes easily readable residual rate display images RI. This method prevents the residual rate display images RI from being too difficult to read due to their display lengths being too short, for example.

In S125 the management server 300 determines whether the ink supply method of the target printer is the double-chamber supply method based on the printer information acquired from the target printer specifying the supply method for ink Ik. In this example, the management server 300 determines that the supply method is a double-chamber supply method when the target printer is the printer 100A or 100B, and determines that the supply method is not the double-chamber supply method when the target printer is the printer 100C.

If the supply method of the ink Ik is a double-chamber supply method (S125: YES), in S130 the management server 300 determines whether the remaining printable sheet number RN is less than or equal to the tank printable sheet number SN for the target printer. Put another way, a remaining printable sheet number RN less than or equal to the tank printable sheet number SN signifies that the storage state of ink Ik for a target printer having a double-chamber supply method is the second storage state S2, and a remaining printable sheet number RN greater than the tank printable sheet number SN signifies that the storage state of ink Ik for the target printer is the first storage state S1.

When the remaining printable sheet number RN is less than or equal to the tank printable sheet number SN (S130: YES), the ink cartridge 200A no longer contains residual ink Ik since the storage state of the ink Ik is the second storage state S2. Consequently, in S135 the management server 300 sets the cartridge residual rate CR to 0% (see equation (1)). In S140 the management server 300 calculates the intermediate tank residual rate SR (see equation (2)).

When the remaining printable sheet number RN is greater than the tank printable sheet number SN (S130: NO), ink Ik remains in the ink cartridge 200A since the storage state of the ink Ik is the first storage state S1. Accordingly, in S150 the management server 300 calculates the cartridge residual rate CR according to the equation (1). In S155 the management server 300 sets the intermediate tank residual rate SR to 100% (see equation (2)).

When the supply method of the ink Ik is not a double-chamber supply method, i.e., when the supply method is a single-chamber supply method (S125: NO), in S160 the management server 300 calculates the cartridge residual rate CR according to the equation (3). Note that the concept of an intermediate tank residual rate SR does not exist for the printer 100C, since printers employing the single-chamber supply method do not include an intermediate tank. Therefore, when the supply method is a single-chamber supply method, the management server 300 does not calculate the intermediate tank residual rate SR.

In S165 the management server 300 generates display image data representing the residual rate display image RI. The residual rate display image RI serves to indicate the residual rate (percentage) of ink Ik (the cartridge residual rate CR and the intermediate tank residual rate SR) set based on the remaining printable sheet number RN and the like. FIGS. 6(A) and 6(B) show examples of the residual rate display image RIa represented by display image data generated when the target printer is the printer 100A, which employs the double-chamber supply method. FIG. 6(A) depicts the residual rate display image RIa when the storage state of ink Ik in the printer 100A is in the first storage state S1.

As shown in FIG. 6(A), the residual rate display image RIa for the double-chamber supply method includes a main object MOa, and a sub object SOa. The main object MOa and sub object SOa are both band-like objects extending linearly in the left-right direction. The main object MOa includes a left end E1a and a right end E2a. The sub object SOa includes a left end E3a and a right end E4a. The left end E1a is in contact with the right end E4a.

The main object MOa functions to indicate the cartridge residual rate CR. Positions in the longitudinal direction of the main object MOa (the left-right direction in FIG. 6(A)) correspond to possible values of the cartridge residual rate CR (values between 0 and 100%). For example, the left end E1a of the main object MOa corresponds to the smallest possible value (0%) of the cartridge residual rate CR, while the right end E2a of the main object MOa corresponds to the largest possible value (100%) of the cartridge residual rate CR.

Since the cartridge residual rate CR corresponds to the residual quantity of ink Ik in the first storage state S1, the longitudinal positions of the main object MOa correspond to the possible residual quantities of ink Ik in the first storage state S1. For example, the left end E1a corresponds to the smallest possible residual quantity of ink Ik in the first storage state S1, while the right end E2a corresponds to the largest possible residual quantity of ink Ik in the first storage state S1. As the position in the longitudinal direction of the main object MOa moves from right to left, the corresponding residual quantity of ink Ik grows smaller. Hence, a first position on the main object Moa in the longitudinal direction (e.g., the position of the right end E2a of the main object MOa) corresponds to a first residual quantity of ink Ik (e.g., the maximum value in the first storage state S1), while a second position farther leftward from the first position (e.g., the position of the left end E1a of the main object MOa) corresponds to a second residual quantity of ink Ik smaller than the first residual quantity (e.g., the minimum value in the first storage state S1). Thus, the band-like main object MOa can be used to render a residual rate display image RIa by which the residual rate (percentage) of ink Ik for the printer 100A in the first storage state S1 can be easily grasped.

The sub object SOa functions to indicate the intermediate tank residual rate SR. Positions in the longitudinal direction of the sub object SOa (left-right direction in FIG. 6(A)) correspond to possible values of the intermediate tank residual rate SR (values between 0 and 100%). For example, the left end E3a corresponds to the smallest possible value of the intermediate tank residual rate SR (0%), and the right end E4a corresponds to the largest possible value of the intermediate tank residual rate SR (100%).

Since the intermediate tank residual rate SR corresponds to the residual quantity of ink Ik during the second storage state S2, positions in the longitudinal direction of the sub object SOa may be said to correspond to possible residual quantities of ink Ik in the second storage state S2. For example, the left end E3a of the sub object SOa corresponds to the smallest possible residual quantity of ink Ik in the second storage state S2, while the right end E4a of the sub object SOa corresponds to the largest possible residual quantity of ink Ik in the second storage state S2. Similar to the main object MOa, as the longitudinal position on the sub object SOa moves from right to left, the corresponding residual quantity of ink Ik grows smaller. The right end E4a of the sub object SOa is at the same longitudinal position as the left end E1a of the main object MOa.

The residual rate display image RIa has a total longitudinal length TLa corresponding to the display length TL set in S120. The ratio of the total longitudinal length TLa of the residual rate display image RIa to a longitudinal length SLa of the sub object SOa is equivalent to the ratio of the total printable sheet number TN to the tank printable sheet number SN. The residual rate display image RIa includes a residual rate indication area IAa and a consumed rate indication area EAa. The residual rate indication area IAa is shown as the shaded section in the residual rate display image RIa and indicates the residual rate (percentage) of ink Ik. The consumed rate indication area EAa is shown as the unshaded section in the residual rate display image RIa and indicates the rate (percentage) of consumed ink Ik. In the first storage state S1, a boundary IEa between the residual rate indication area IAa and the consumed rate indication area EAa falls inside the main object MOa. In the first storage state S1, the entirety of the sub object SOa is included in the residual rate indication area IAa since the intermediate tank residual rate SR is 100%. The percentage of a section in the main object MOa occupied by the residual rate indication area IAa to the entire main object MOa is equivalent to the cartridge residual rate CR. More specifically, the main object MOa has a total longitudinal length MLa. The section in the main object MOa occupied by the residual rate indication area IAa has a longitudinal length CRLa. The percentage of the longitudinal length CRLa to the total longitudinal length MLa is equivalent to the cartridge residual rate CR. The residual rate indication area IAa includes a longitudinal length RLa. The ratio of the longitudinal length RLa to the total longitudinal length TLa is equivalent to the ratio of the remaining printable sheet number RN to the total printable sheet number TN.

FIG. 6(B) shows the residual rate display image RIa when the storage state of ink Ik for the printer 100A is the second storage state S2. In the second storage state S2, the boundary IEa between the residual rate indication area IAa and the consumed rate indication area EAa falls within the sub object SOa. Since the cartridge residual rate CR in the second storage state S2 is 0%, the entirety of the main object MOa constitutes part of the consumed rate indication area EAa. The percentage of the section in the sub object SOa occupied by the residual rate indication area IAa to the entire sub object SOa is equivalent to the intermediate tank residual rate SR. Specifically, the sub object SOa has a longitudinal length SLa. The residual rate indication area IAa has a longitudinal length RLa. The percentage of the longitudinal length RLa to the longitudinal length SLa is equivalent to the intermediate tank residual rate SR.

FIG. 6(C) shows an example of a residual rate display image RIb represented by display image data that was generated when the target printer is the printer 100B, which employs a double-chamber supply method.

As shown in FIG. 6(C), the residual rate display image RIb for a double-chamber supply method includes a main object MOb, and a sub object SOb, similar to the residual rate display image RIa described above. The main object MOb includes a left end E1b and a right end E2b. The sub object SOb includes a left end E3b and a right end E4b. The left end E1b is in contact with the right end E4b.

Positions in the longitudinal direction of the main object MOb correspond to possible values of the cartridge residual rate CR (values between 0 and 100%). Since the cartridge residual rate CR corresponds to the residual quantity of ink Ik in the first storage state S1, longitudinal positions in the main object MOb may be said to correspond to possible residual quantities of ink Ik in the first storage state S1. For example, the left end E1b corresponds to the smallest possible residual quantity of ink Ik in the first storage state S1, while the right end E2b corresponds to the largest possible residual quantity of ink Ik in the first storage state S1.

Positions in the longitudinal direction of the sub object SOb correspond to possible values of the intermediate tank residual rate SR (values between 0 and 100%). Since the intermediate tank residual rate SR corresponds to the residual quantity of ink Ik in the second storage state S2, longitudinal positions in the sub object SOb correspond to possible residual quantities of ink Ik in the second storage state S2. For example, the left end E3b corresponds to the smallest possible residual quantity of ink Ik in the second storage state S2, while the right end E4b corresponds to the largest possible residual quantity of ink Ik in the second storage state S2. The longitudinal position of the right end E4b of the sub object SOb is at the same longitudinal position of the left end E1b of the main object MOb.

A total longitudinal length TLb of the residual rate display image RIb is the display length TL set in S120. The ratio of the total longitudinal length TLb of the residual rate display image RIb to a longitudinal length SLb of the sub object SOb is equivalent to the ratio of the total printable sheet number TN to the tank printable sheet number SN. The residual rate display image RIb includes a residual rate indication area IAb and a consumed rate indication area EAb. The percentage of a section in the main object MOb occupied by the residual rate indication area IAb to the entire main object MOb is equivalent to the cartridge residual rate CR. Specifically, the main object MOb has a total longitudinal length MLb and the section in the main object MOb occupied by the residual rate indication area IAb has a longitudinal length CRLb. The percentage of the longitudinal length CRLb to the total longitudinal length MLb is equivalent to the cartridge residual rate CR. The residual rate display image RIb has a total longitudinal length TLb and the residual rate indication area IAb has a longitudinal length RLb. The ratio of the longitudinal length RLb to the total longitudinal length TLb is equivalent to the ratio of the remaining printable sheet number RN to the total printable sheet number TN.

FIG. 6(D) shows an example of a residual rate display image RIc represented by display image data that is generated when the target printer is the printer 100C, which employs the single-chamber supply method. Since the printer 100C employing a single-chamber supply method is not provided with an intermediate tank, the residual rate display image RIc includes only a main object MOc and not a sub object. The residual rate display image RIc (the main object MOc) includes a residual rate indication area IAc and a consumed rate indication area EAc. The residual rate display image RIc (the main object MOc) has a total longitudinal length TLc and the residual rate indication area IAc has a longitudinal length RLc. In the case of the single-chamber supply method, the percentage of the longitudinal length RLc to the total longitudinal length TLc is equivalent to the ratio of the remaining printable sheet number RN to the total printable sheet number TN. Here, the total longitudinal length TLc is the display length TL set in S120.

In S170 of FIG. 5, the management server 300 determines whether all printers under management have been processed as the target printer. If there remain unprocessed printers (S170: NO), the management server 300 returns to S115 and selects an unprocessed printer to be the target printer. When all printers have been processed (S170: YES), the management server 300 advances to S175.

Figure 7:
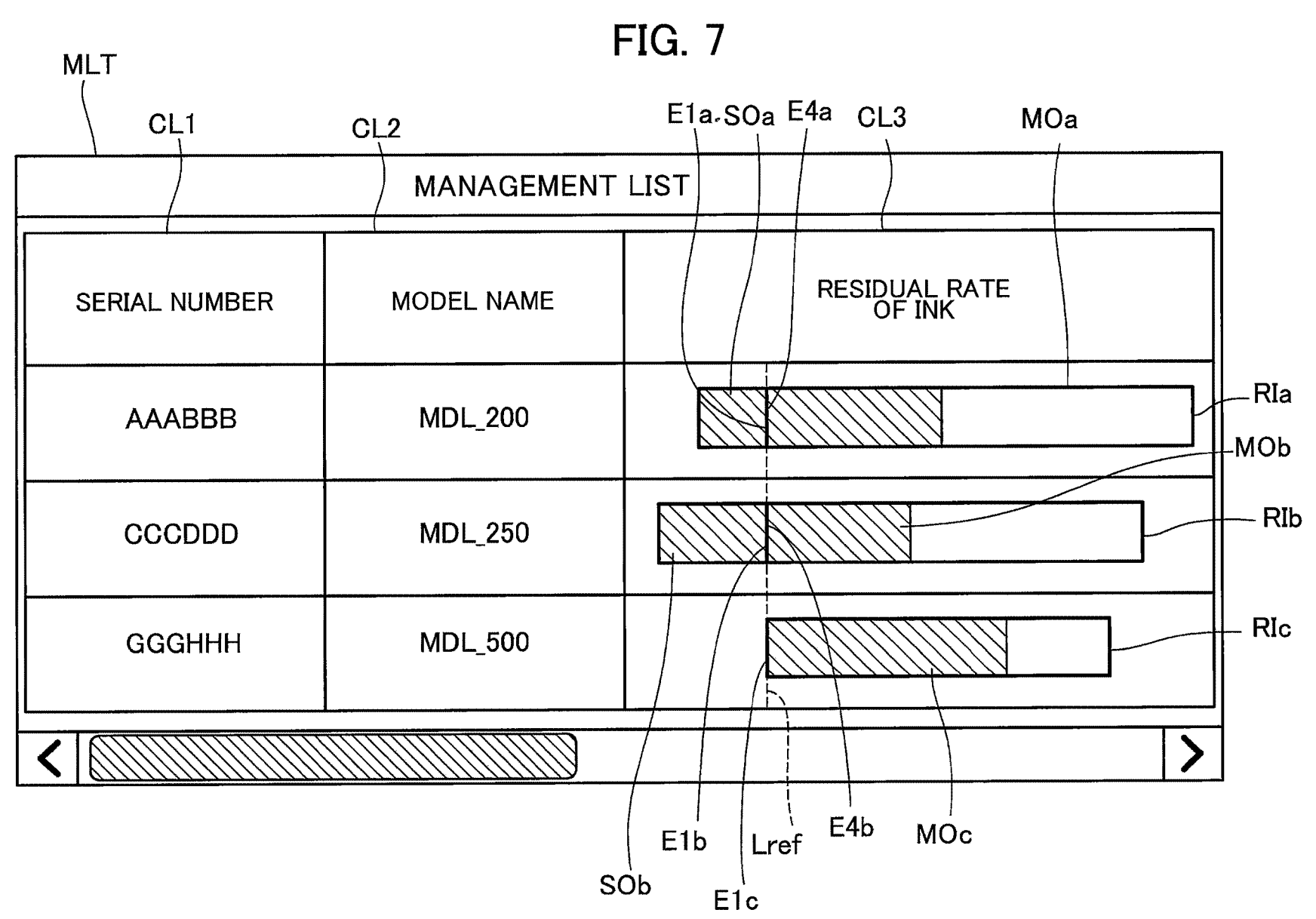

In S175 the management server 300 generates image data representing the management list MLT using the display image data generated for each of the printers 100A, 100B, and 100C. The management list MLT is a list of printer information for the printers 100A, 100B, and 100C under management. The management list MLT includes a plurality of columns displaying items in the printer information. FIG. 7 shows an example of a management list MLT that includes three display columns CL1, CL2, and CL3. The display column CL1 displays the serial numbers of the printers 100A, 100B, and 100C under management. The display column CL2 displays the model names of the printers 100A, 100B, and 100C. The display column CL3 displays information indicating the residual rate (percentage) of ink Ik for each of the printers 100A, 100B, and 100C, and specifically the residual rate display images RIa, RIb, and RIc described above.

In the display column CL3, the positions of the left end E1a of the main object MOa in the residual rate display image RIa, the left end E1b of the main object MOb in the residual rate display image RIb, and a left end E1c of the main object MOc in the residual rate display image RIc are all aligned at a prescribed reference position Lref in the longitudinal direction. The positions of the right end E4a of the sub object SOa in the residual rate display image RIa and the right end E4b of the sub object SOb in the residual rate display image RIb are also aligned at the reference position Lref in the longitudinal direction.

After generating the image data in S175, the management server 300 ends the image data generating process.

The management server 300 displays the management list MLT on the display 340 at predetermined timings by using the image data generated in the image data generating process. For example, the management server 300 may display the management list MLT when starting up the computer program PG2. The management server 300 may also display the management list MLT on the display 340 when a display request is acquired from the user via the operation interface 350. The user of the management server 300 is the administrator of the system 1000, for example. The administrator of the system 1000 may be a user of the printers 100A, 100B, and 100C or may be someone other than a user of the printers 100A, 100B, and 100C, such as the vendor of the printers 100A, 100B, and 100C.

According to the embodiment described above, the management server 300 acquires a remaining printable sheet number RN from each of the printers 100A, 100B, and 100C (S110 of FIG. 5), where the remaining printable sheet number RN is information related to the residual quantity of ink Ik. The management server 300 generates image data representing the management list MLT (S115-S175 of FIG. 5). Here, the management list MLT includes the residual rate display images RIa, RIb, and RIc. The residual rate display image RIa is for indicating the residual rate (percentage) of ink Ik (the cartridge residual rate CR and the intermediate tank residual rate SR) set based on the remaining printable sheet number RN for the printer 100A. The residual rate display image RIb is for displaying the residual rate (percentage) of ink Ik set based on the remaining printable sheet number RN for the printer 100B. The residual percentage display image RIc is for displaying the residual rate of ink Ik set based on the remaining printable page number RN for the printer 100C. In the management list MLT, the longitudinal position on the main object MOa corresponding to the smallest possible residual quantity of ink Ik for the printer 100A in the first storage state S1 (and specifically the left end E1a of the main object MOa), the longitudinal position on the sub object SOa corresponding to the largest possible residual quantity of ink Ik for the printer 100A in the second storage state S2 (and specifically the right end E4a of the sub object SOa), and the longitudinal position on the main object MOb corresponding to the smallest possible residual quantity of ink Ik for the printer 100B in the first storage state S1 (and specifically the left end E1b of the main object MOb) are all at the reference position Lref. Hence, the management server 300 can provide the management list MLT with which the user can easily grasp the residual rates (percentages) of ink Ik. For example, the management server 300 can provide the management list MLT by which the user can easily grasp the residual rate of ink Ik for the printer 100A and the residual rate of ink Ik for the printer 100B.

In addition, in the management list MLT according to the embodiment, the longitudinal position on the main object MOa corresponding to the smallest possible residual quantity of ink Ik for the printer 100A in the first storage state S1 (and specifically the left end E1a of the main object MOa), the longitudinal position on the sub object SOa corresponding to the largest possible residual quantity of ink Ik for the printer 100A in the second storage state S2 (and specifically the right end E4a of the sub object SOa), and the longitudinal position on the main object MOc corresponding to the smallest possible residual quantity of ink Ik for the printer 100C are all at the reference position Lref in the management list MLT. Accordingly, the management server 300 can provide the management list MLT by which the user can easily grasp the residual rate of ink Ik for the printer 100A and the residual rate of ink Ik for the printer 100C.

In the embodiment described above, the longitudinal position on the sub object SOb corresponding to the largest possible residual quantity of ink Ik for the printer 100B in the second storage state S2 (and specifically the right end E4b of the sub object SOb) is also at the reference position Lref in the management list MLT. Thus, the management server 300 can provide the management list MLT with which the user can easily grasp the residual percentage of ink Ik for the printer 100A and the residual percentage of ink Ik for the printer 100B.

In the embodiment, the main objects MOa, MOb, and MOc are all band-like objects extending rightward from the reference position Lref, while the sub objects SOa and SOb are both band-like objects extending leftward from the reference position Lref, i.e., in the opposite direction to the extending direction of the main objects MOa, MOb, and MOc. Hence, the user can understand at a glance whether the storage states of ink in the printers 100A and 100B employing the double-chamber supply method are the first storage state S1 or the second storage state S2.

In the embodiment, the residual rate display image RIa includes the consumed rate indication area EAa and the residual rate indication area IAa. Accordingly, the user can easily grasp the ratio of the residual quantity of ink Ik to the initial quantity of ink in the ink cartridge 200A (i.e., the residual rate of ink Ik).

As described above, the management server 300 executes the image data generating process in FIG. 5 a plurality of times using each of the printers 100A, 100B, and 100C as the target printer. In other words, the management server 300 acquires printer information including a remaining printable sheet number RN from each of the printers 100A, 100B, and 100C via the communication interface 380 (S110 in FIG. 5). Accordingly, the management server 300 can generate image data representing the management list MLT that includes the residual rate display image RIa for the printer 100A, the residual rate display image RIb for the printer 100B, and the residual rate display image RIc for the printer 100C. In this way, the management server 300 can provide the management list MLT with which the user can easily grasp the residual quantities of ink Ik for a plurality of printers.

As described above, the ink cartridge 200A is an example of the first cartridge, and the ink cartridges 200B and 200C are examples of the second cartridges. The remaining printable sheet number RN acquired from the printer 100A is an example of the first information, and the remaining printable sheet numbers RN acquired from the printers 100B and 100C are examples of the second information. The main object MOa in the residual rate display image RIa is an example of the first object, and the sub object SOa is an example of the second object. The main objects MOb and MOc of the corresponding residual rate display images RIb and RIc are examples of the third objects, and the sub object SOb of the residual rate display image RIb is an example of the fourth object. The first storage state S1 for the printer 100A is an example of the first state, the second storage state S2 for the printer 100A is an example of the second state, the first storage state S1 for the printer 100B is an example of the third state, and the second storage state S2 for the printer 100B is an example of the fourth state. In addition, the state of the printer 100C in which ink Ik remains in the ink cartridge 200C is an example of the third state.

Figure 8:
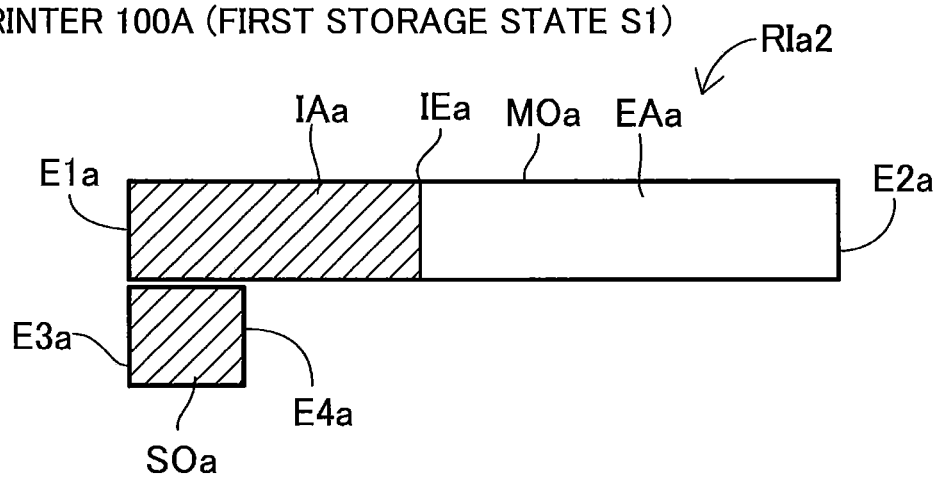
FIG. 8(A) is an explanatory diagram illustrating a residual rate display image for a printer having the double-chamber supply method when the storage state is the first storage state according to a variation.
FIG. 8(B) is an explanatory diagram illustrating a residual rate display image for the printer having the double-chamber supply method when the storage state is the second storage state according to the variation.
Figure 8:
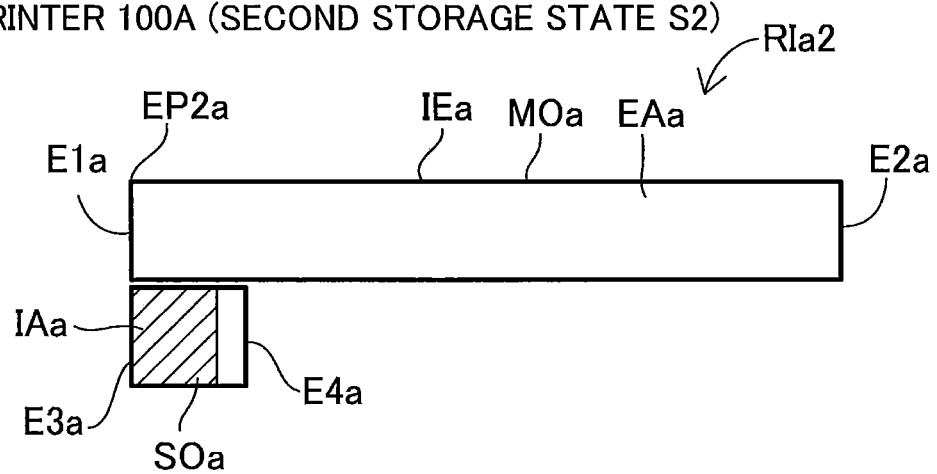

B. Variations of the Embodiment (1) FIGS. 8(A) and 8(B) show a residual rate display image RIa2 according to a variation. FIG. 8(A) shows the residual rate display image RIa2 for the printer 100A employing the double-chamber supply method when the storage state of ink Ik for the printer 100A is the first storage state S1. FIG. 8(B) shows the residual rate display image RIa2 when the storage state of ink Ik for the printer 100A is the second storage state S2.

As with the residual rate display image RIa in FIGS. 6(A) and 6(B), the residual rate display image RIa2 shown in in FIGS. 8(A) and 8(B) includes the main object MOa, and the sub object SOa. In the residual rate display image RIa of FIGS. 6(A) and 6(B), the main object MOa and the sub object SOa are arranged at the same vertical position so that the longitudinal position of the left end E1a of the main object MOa coincides with the longitudinal position of the right end E4a of the sub object SOa. However, in the residual rate display image RIa2 of FIGS. 8(A) and 8(B), the main object MOa and the sub object SOa are arranged at different vertical positions and are adjacent to each other vertically so that the longitudinal position of the left end E1a of the main object MOa coincides with the longitudinal position of the left end E3a of the sub object SOa.

Figure 9:
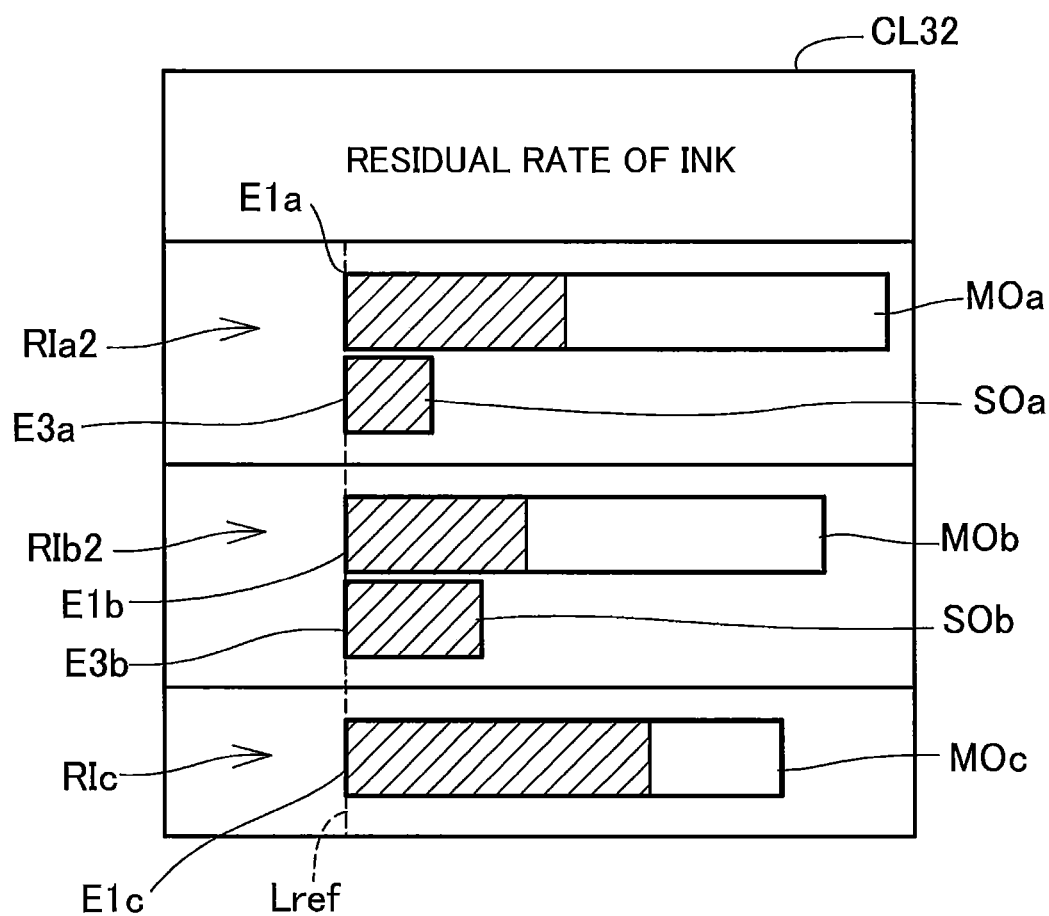
FIG. 9 is an explanatory diagram illustrating an example of a display column according to a variation.

FIG. 9 shows a display column CL32 displaying residual rates (percentages) of ink Ik according to the variation. As shown in FIG. 9, a residual rate display image RIb2 for the printer 100B includes the main object MOb and the sub object SOb, similar to the residual rate display image RIa2 for the printer 100A. Here, the main object MOb and the sub object SOb are arranged at different vertical positions and are adjacent to each other vertically so that the longitudinal position of the left end E1b of the main object MOb coincides with the longitudinal position of the left end E3b of the sub object SOb. In the variation shown in FIG. 9, the residual rate display image RIc for the printer 100C employ-ing a single-chamber supply method is identical to the residual rate display image RIc in the embodiment.

In the display column CL32 of the variation shown in FIG. 9, a longitudinal position on the main object MOa corresponding to the smallest possible residual quantity of ink Ik for the printer 100A in the first storage state S1 (and specifically the left end E1a of the main object MOa), a longitudinal position on the sub object SOa corresponding to the smallest possible residual quantity of ink Ik for the printer 100A in the second storage state S2 (and specifically the left end E3a of the sub object SOa), and a longitudinal position on the main object MOb corresponding to the smallest possible residual quantity of ink Ik for the printer 100B in the first storage state S1 (and specifically the left end E1b of the main object MOb) are all at the reference position Lref in the management list MLT. Further, the objects MOa, SOa, MOb, and SOb all extend rightward from the reference position Lref. In this way, the management server 300 can provide the management list by which the user can easily grasp the residual rates of ink Ik for the printers 100A and 100B.

Similarly, in the display column CL32 a longitudinal position on the sub object SOb corresponding to the smallest possible residual quantity of ink Ik for the printer 100B in the second storage state S2 (and specifically the left end E3b of the sub object SOb) and a longitudinal position on the main object MOc corresponding to the smallest possible residual quantity of ink Ik for the printer 100C (and specifically the left end E1c of the main object MOc) are at the reference position Lref. Both of the sub object SOb and the main object MOc extend rightward from the reference position Lref. In this way, the management server 300 can provide the management list by which the residual quantities of ink Ik for the printers 100B and 100C can be easily grasped.

(2) In the embodiment described above, as shown in FIG. 7, the residual rate display images RIa, RIb, and RIc specifying residual rates of ink Ik are displayed in the display column CL3 of the management list MLT as images indicating index values related to the residual quantities of ink Ik. However, the display column may display other index values representing residual quantities of ink Ik, such as remaining printable sheet numbers RN or the actual residual quantities of ink Ik. Such variations can also provide a display column by which the residual quantities of ink Ik in the printers 100A, 100B, and 100C can easily be grasped. Further, in this variation, a cartridge printable sheet number CP may be set to a value obtained by dividing the residual quantity of ink Ik by the average quantity of ink used for printing one sheet, for example. An example of this variation in which remaining printable sheet numbers RN are displayed will be described next.

Figure 10:
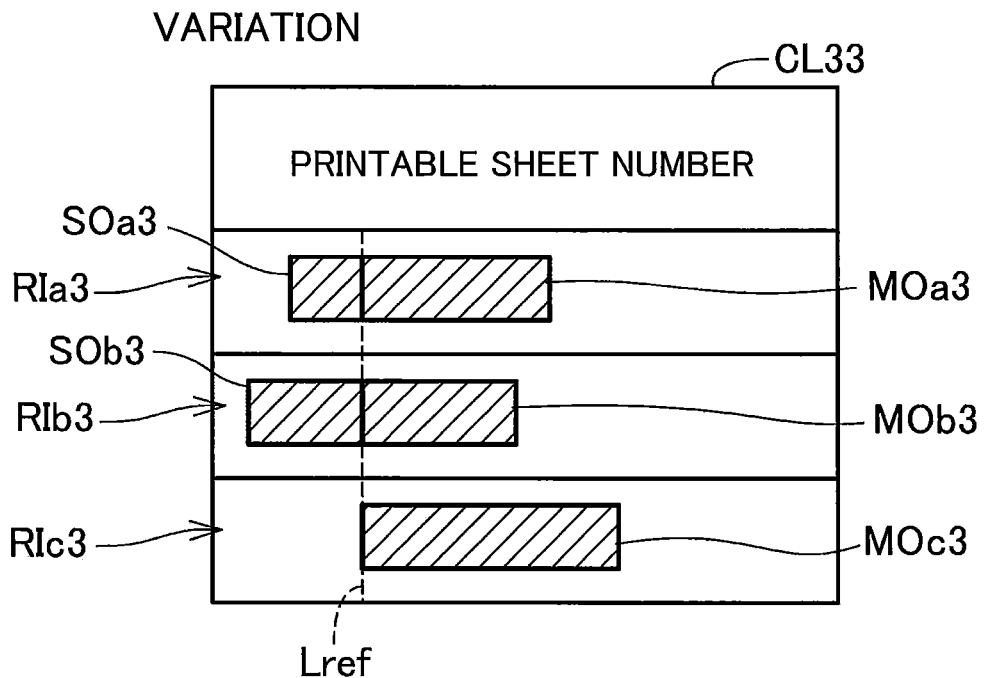
FIGS. 10(A) and 10(B) are explanatory diagrams illustrating examples of display columns according to variations.
Figure 10:
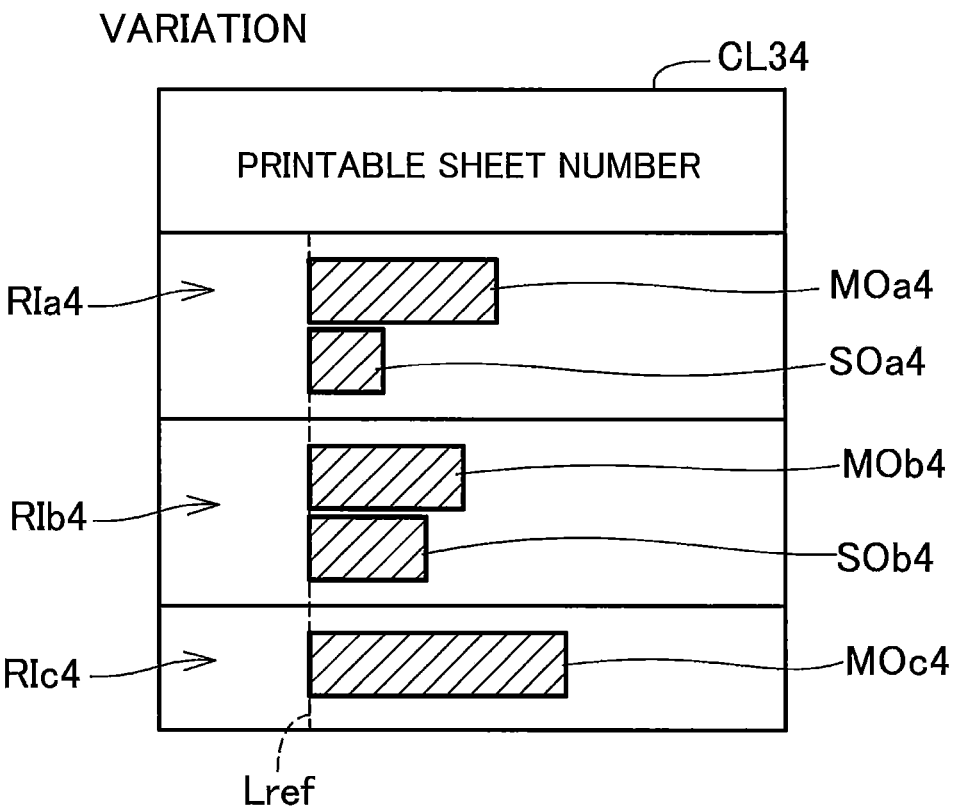

FIGS. 10(A) and 10(B) show examples of display columns CL33 and CL34 for displaying printable sheet numbers according to the variation. Sheet number display images RIa3, RIb3, and RIc3 are displayed in the display column CL33 of FIG. 10(A), and sheet number display images RIa4, RIb4, and RIc4 are displayed in the display column CL34 shown in FIG. 10(B).

In the present variation, rather than setting the cartridge residual rate CR to 0% in S135 of FIG. 5, the management server 300 sets a sheet number CP of printing material that can be printed using the remaining ink Ik in the ink cartridge (hereinafter called the "cartridge printable sheet number CP") to 0. When the target printer employs the double-chamber supply method and is in the second storage state S2, the cartridge printable sheet number CP is set to 0 in this way. In S140 the management server 300 obtains a sheet number SP of printing material that can be printed based on the ink Ik remaining in the intermediate tank (hereinafter called the "remaining tank printable sheet number SP") rather than calculating the intermediate tank residual rate SR. When the target printer employs the double-chamber supply method and is in the second storage state S2, the remaining tank printable sheet number SP is equivalent to the remaining printable sheet number RN (SP=RN).

In S150 the management server 300 calculates the cartridge printable sheet number CP rather than the cartridge residual rate CR. When the target printer has the double-chamber supply method and is in the first storage state S1, the cartridge printable sheet number CP is found by subtracting the tank printable sheet number SN from the remaining printable sheet number RN (CP=RN−SN). In S155 the management server 300 sets the remaining tank printable sheet number SP rather than the intermediate tank residual rate SR. When the printer employs the double-chamber supply method and is in the first storage state S1, the remaining tank printable sheet number SP is equivalent to the tank printable sheet number SN in the original (SP=SN). With the double-chamber supply method is employed, the sum of the remaining tank printable sheet number SP and the cartridge printable sheet number CP is equivalent to the remaining printable sheet number RN (RN=SP+CP).

In S160 the management server 300 sets the cartridge printable sheet number CP rather than the cartridge residual rate CR. With a single-chamber supply method, the cartridge printable sheet number CP is equivalent to the remaining printable sheet number RN (CP=RN).

The sheet number display images RIa3, RIb3, and RIc3 in FIG. 10(A) indicate the remaining printable sheet numbers RN of the corresponding printers 100A, 100B, and 100C. As shown in FIG. 10(A), the sheet number display image RIa3 includes a main object MOa3, and a sub object SOa3. Similarly, the sheet number display image RIb3 includes a main object MOb3, and a sub object SOb3. The sheet number display image RIc3 includes a main object MOc3. In each sheet number display image, the corresponding main object and the sub object are arranged at the same vertical position and are adjacent to each other in the left-right direction. Each main object is a band-like object specifying the cartridge printable sheet number CP by its longitudinal length. Each sub object is a band-like object specifying the remaining tank printable sheet number SP by its longitudinal length. The total length of each sheet number display image specifies the remaining printable sheet number RN.

In this variation, as in the display column CL3 of the embodiment (see FIG. 7), the longitudinal positions of the left end of the main object MOa3 constituting the sheet number display image RIa3, the left end of the main object MOb3 constituting the sheet number display image RIb3, and the left end of the main object MOc3 constituting the sheet number display image RIc3 are all at the prescribed reference position Lref. Similarly, the longitudinal positions of the right end of the sub object SOa3 constituting the sheet number display image RIa3 and the right end of the sub object SOb3 constituting the sheet number display image RIb3 are all at the reference position Lref.

The sheet number display images RIa4, RIb4, and RIc4 in FIG. 10(B) specify the remaining printable sheet numbers RN of the corresponding printers 100A, 100B, and 100C. As shown in FIG. 10(B), the sheet number display image RIa4 includes a main object MOa4, and a sub object SOa4. Similarly, the sheet number display image RIb4 includes a main object MOb4, and a sub object SOb4. The sheet number display image RIc4 includes a main object MOc4. The main object and sub object in each of the sheet number display images are arranged at different vertical positions and are adjacent to each other vertically. Each main object is a band-like object specifying the cartridge printable sheet number CP by its longitudinal length. Each sub object is a band-like object specifying the remaining tank printable sheet number SP by its longitudinal length.

In this variation, as in the display column CL32 of the first variation (see FIG. 9), the longitudinal positions of the left end of the main object MOa4 constituting the sheet number display image RIa4, the left end of the main object MOb4 constituting the sheet number display image RIb4, and the left end of the main object MOc4 constituting the sheet number display image RIc4 are all at the prescribed reference position Lref. The longitudinal positions of the left end of the sub object SOa4 constituting the sheet number display image RIa4 and the left end of the sub object SOb4 constituting the sheet number display image RIb4 are all at the prescribed reference position Lref.

(3) In the embodiment and variations described above, the main object and the sub object of each display image are band-like objects extending linearly, but these objects may be curved band-like objects.

Figure 11:
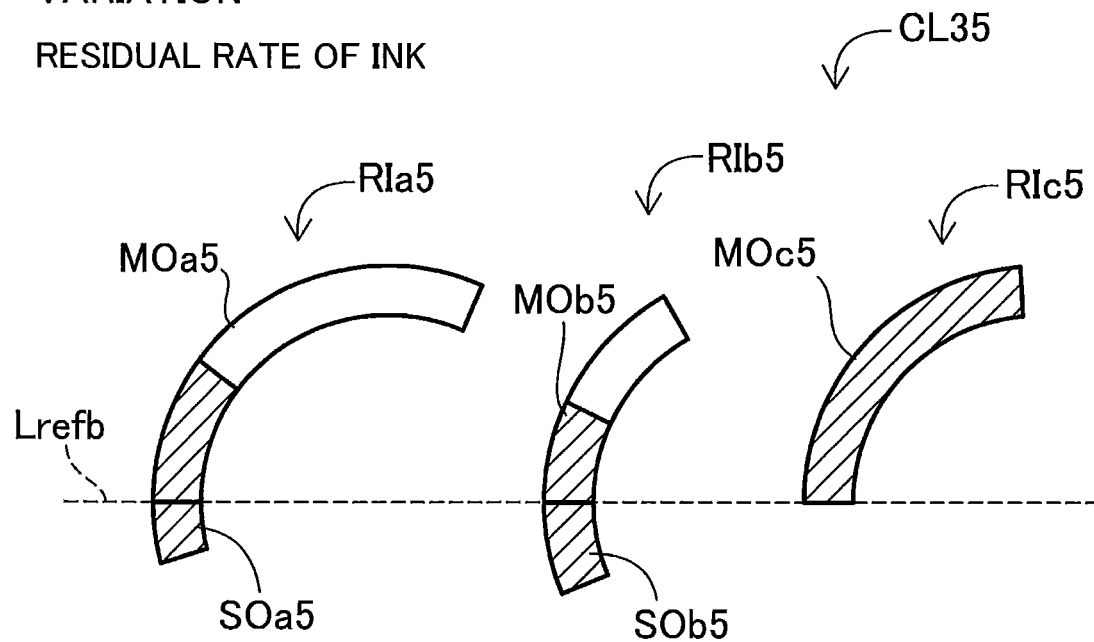
FIGS. 11(A) and 11(B) are explanatory diagrams illustrating examples of display columns according to variations.
Figure 11:
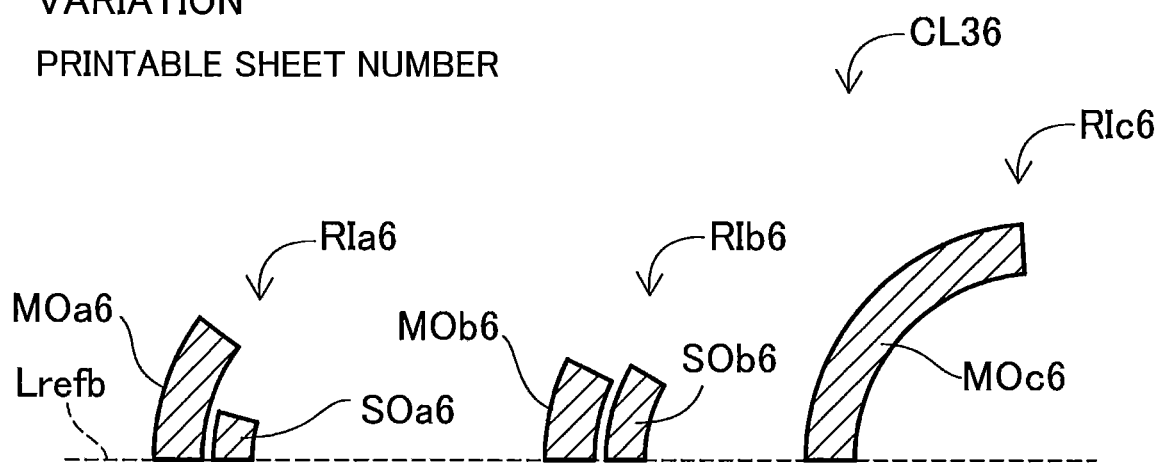

FIGS. 11(A) and 11(B) show display examples of columns CL35 and CL36 for displaying printable sheet numbers according to another variation of the embodiment. Residual rate display image RIa5, RIb5, and RIc5 are displayed in the display column CL35 of FIG. 11(A), and sheet number display images RIa6, RIb6, and RIc6 are displayed in the display column CL36 of FIG. 11(B).

As with the residual rate display images RIa, RIb, and RIc in the embodiment, the residual rate display images RIa5, RIb5, and RIc5 in FIG. 11(A) indicate residual rate (percentages) of ink Ik (the cartridge residual rate CR and the intermediate tank residual rate SR) for the corresponding printers 100A, 100B, and 100C. As shown in FIG. 11(A), the residual rate display image RIa5 includes a main object MOa5, and a sub object SOa5. Similarly, the residual rate display image RIb5 includes a main object MOb5, and a sub object SOb5. The residual rate display image RIc5 includes a main object MOc5. Each of the main object and the sub object is a band-like object extending in an arcuate shape in a circumferential direction. In each residual rate display image, the main object and the sub object have the same radial position and are juxtaposed in the circumferential direction. The longitudinal (circumferential) length of each main object indicates the cartridge residual rate CR, and the longitudinal length of each sub object indicates the intermediate tank residual rate SR.

Similar to the embodiment, positions in the longitudinal direction (circumferential direction) in each of the main objects MOa5 and MOb5 correspond to possible values of the cartridge residual rate CR (or possible residual quantities of the ink Ik) for the corresponding printer when the storage state is the first storage state S1. Positions in the longitudinal direction (circumferential direction) in each of the sub objects SOa5 and SOb5 correspond to possible vales of the intermediate tank residual rate SR (or possible residual quantities of the ink Ik) for the corresponding printer when the storage state is the second storage state S2. Positions in the longitudinal direction (circumferential direction) in the main object MOc5 correspond to possible values of the cartridge residual rate CR (or possible residual quantities of the ink Ik) for the printer C. In this variation, the circumferential end of each of the main object and the sub object corresponding to the smallest possible index value (the cartridge residual rate CR or the intermediate tank residual rate SR, for example) will be called a "minimum value end," and the circumferential end corresponding to the largest possible index value will be called a "maximum value end." In this variation, the longitudinal positions of the minimum value end of the main object MOa5 in the residual rate display image RIa5, the minimum value end of the main object MOb5 in the residual rate display image RIb5, and the minimum value end of the main object MOc5 in the residual rate display image RIc5 are at a prescribed reference position Lrefb in the longitudinal direction. The longitudinal positions of the maximum value end of the sub object SOa5 in the residual rate display image RIa5 and the maximum value end of the sub object SOb5 in the residual rate display image RIb5 are also at the prescribed reference position Lrefb.

The sheet number display images RIa6, RIb6, and RIc6 in FIG. 11(B) specify the remaining printable sheet numbers RN of the corresponding printers 100A, 100B, and 100C. As shown in FIG. 11(B), the sheet number display image RIa6 includes a main object MOa6, and a sub object SOa6. Similarly, the sheet number display image RIb6 includes a main object MOb6, and a sub object SOb6. The sheet number display image RIc6 includes a main object MOc6. In each of the sheet number display images, the main object and the sub object are disposed at different radial positions and are adjacent to each other radially. The longitudinal (circumferential) length of each main object indicates the cartridge printable sheet number CP, while the longitudinal length of each sub object indicates the remaining tank printable sheet number SP.

In this variation, the longitudinal positions for the minimum value end of the main object MOa6 in the sheet number display image RIa6, the minimum value end of the main object MOb6 in the sheet number display image RIb6, and the minimum value end of the main object MOc6 in the sheet number display image RIc6 are all at the prescribed reference position Lrefb. Also, the longitudinal positions of the minimum value end of the sub object SOa6 in the sheet number display image RIa6 and the minimum value end of the sub object SOb6 in the sheet number display image RIb6 are at the prescribed reference position Lrefb.

With this variation, the management server 300 can still provide display columns with which the user can easily grasp the residual quantities of ink Ik for the printers 100A, 100B, and 100C.

(4) The printer 100A used as an example of the target printer in the embodiment described above is provided with a monochromatic print execution device 160 employing a single ink color (black (K), for example). However, the printer 100A may be provided with a printing mechanism using multiple colors of ink, such as a printing mechanism capable of printing color images using ink in the four colors cyan (C), magenta (M), yellow (Y), and black (K). In this case, four ink cartridges 200A corresponding to the four colors of ink can be mounted in the printer 100A. The printer 100A is also provided with four ink supply portions 170A corresponding to the four ink colors. With this configuration, the initial quantity of ink Ik may be different for all or some of the ink cartridges 200A. For example, ink cartridges 200A for chromatic inks C, M, and Y may have different initial quantities of ink Ik than that of the ink cartridge 200A for the achromatic ink K. Further, the boundary ink volume in the intermediate tank 175A may differ for all or some of the ink cartridges 200A. For example, the intermediate tanks 175A corresponding to ink cartridges 200A for the chromatic inks C, M, and Y may have a different boundary ink volume from that of the intermediate tank 175A corresponding to the ink cartridge 200A for the achromatic ink K.

In this example, the display column for displaying residual rate display images includes four such residual rate display images for a single printer to correspond to the four colors of ink. Each of these four display images includes a main object and a sub object, as with the residual rate display image RIa in FIG. 6(A) or the residual rate display image RIa2 in FIG. 8(A). The longitudinal positions for the minimum value ends of all main objects in the four display images are aligned at the prescribed reference position. The longitudinal positions for either the maximum value ends or the minimum value ends of the sub objects in the four display images are also aligned at the prescribed reference position.

(5) In the embodiment described above, the display column CL3 is displayed on the display 340 of the management server 300. However, when the printer is provided with four colors of ink, as in the variation (4) described above, a display column that includes four residual rate display images corresponding to the four ink colors may be displayed on the display 140 of the printer 100A. In this case, the printer 100A (the CPU 110) may generate screen data representing the display column based on printer information stored in the information database IB, and may display this display column on the display 140 based on the screen data.

(6) In the embodiment described above, the target printer, such as the printer 100A, is provided with an inkjet print execution device 160. However, all or a part of the printers 100A-100C may instead be provided with a printing mechanism employing an electrophotographic method (a laser method, for example) for printing images using toner as the printing agent. In this case, the printer 100A or 100B may be provided with a supply portion in which a toner cartridge is mountable, an intermediate tank (a subtank for temporarily storing toner, for example), and a print execution device that executes printing operations using toner accommodated in the intermediate tank. The display columns CL3, and CL32-CL36 (FIGS. 7, 9, 10(A)-11(B)) described above in the embodiment and its variations may be also be applied to the system having this type of printer employing a double-chamber supply method for supplying toner.

(7) In the embodiment described above, the management server 300 acquires the total printable sheet number TN, the remaining printable sheet number RN, and the tank printable sheet number SN from each of the printers 100A, 100B, and 100C and calculates the cartridge residual rate CR and the intermediate tank residual rate SR (S135-S160 of FIG. 5). However, as a variation, each printer may calculate the cartridge residual rate CR and the intermediate tank residual rate SR. In this case, the printers may store the cartridge residual rate CR and the intermediate tank residual rate SR in their information database IB. Hence, the management server 300 may acquire the cartridge residual rate CR and the intermediate tank residual rate SR from each printer in S110 of FIG. 5.

Further, the tank printable sheet number SN may be prestored on the management server 300 in association with the model name for each model of printer. In this case, the management server 300 references the model name acquired from each printer in order to extract the tank printable sheet number SN stored in association with the model name. Similarly, a total printable sheet number TN may be prestored on the management server 300 in association with the part number of each ink cartridge. In this case, the management server 300 may reference the part number of the ink cartridge acquired from each printer in order to extract the total printable sheet number TN stored in association with that part number.

(8) In the embodiment and variations described above, the main object and the sub object of each display image is a band-like object elongated in the left-right direction, but the main object and the sub object may be displayed in other forms. For example, the main object and the sub object may be band-like objects elongated vertically. Alternatively, each of the main object and the sub object may be configured of a plurality of round objects arrayed in a prescribed direction (vertically, for example). In this case, the cartridge residual rate CR and the intermediate tank residual rate SR may be indicated by the number of round objects.

(9) In the embodiment described above, the management server 300 outputs screen data in a form for displaying a management list MLT (see FIG. 7) including display columns on the display 340 based on the screen data. However, the management server 300 may output screen data by transmitting the screen data to a user terminal device, such as a smartphone or a personal computer. In this case, the management list MLT is displayed on a display of the terminal device.

(10) In the embodiment described above, the management server 300 executes the image data generating process of FIG. 5. However, each printer under management may execute the process from S120 to S165 in FIG. 5 to generate the display screen data, and may transmit this display screen data to the management server 300. Thereafter, the management server 300 may use the display screen data acquired from each printer to generate screen data representing the management list MLT.

(11) While the management server 300 is connected to the local area network NT in the embodiment, the management server 300 may be connected to the internet instead. In this case, the printers 100A, 100B, and 100C periodically and automatically transmit printer information to the management server 300, for example. The management server 300 uses this printer information to execute the image data generating process of FIG. 5. Subsequently, the management server 300 transmits screen data representing the management list MLT to a user terminal device in response to a request from the device, as described above. In this case, the management server 300 may be a cloud server, for example, that includes a plurality of computers capable of communicating with each other over a network.

(12) In the embodiment described above, part of the configuration implemented in hardware may be replaced with software and, conversely, all or part of the configuration implemented in software may be replaced with hardware.

(13) When all or some of the functions of the present disclosure are implemented with computer programs, the programs may be stored on a computer-readable storage medium (a non-temporary storage medium, for example). The programs may be used on the same storage medium on which they were supplied or may be transferred to a different storage medium (a computer-readable storage medium). The "computer-readable storage medium" may be a portable storage medium, such as a memory card or CD-ROM; an internal storage built into the computer, such as any of various ROM or the like; or an external storage, such as a hard disk drive, connected to the computer.

While the disclosure has been described in detail with reference to the above embodiments, it would be apparent to those skilled in the art that various changes and modifications may be made thereto.

What is claimed is:

1. An information processing apparatus comprising a processor configured to perform:
   acquiring first information on a residual quantity of printing agent stored in a first cartridge mounted on a first supply portion, the first supply portion being a first type of supply portion including a first tank configured to store printing agent supplied from the first cartridge, the first supply portion being configured to supply the printing agent stored in the first tank to a first print execution device;
   acquiring second information on a residual quantity of printing agent stored in a second cartridge mounted on a second supply portion, the second supply portion being one of a second type of supply portion including a second tank and a third type of supply portion without any tank, the second tank configured to store printing agent supplied from the second cartridge and having a volume different from that of the first tank, the second supply portion being configured to supply the printing agent stored in the second cartridge to a second print execution device;
   generating display screen data representing a display screen including a first display image and a second display image, the first display image being for expressing a first index value based on the first information, the first index value concerning a residual quantity of the printing agent to be supplied to the first print execution device, the second display image being for expressing a second index value based on the second information, the second index value concerning a residual quantity of the printing agent to be supplied to the second print execution device; and
   outputting the display screen data,
   wherein the first display image includes a first object and a second object,
   wherein positions in the first object indicate possible residual quantities of the printing agent to be supplied to the first print execution device in a first state where printing agent remains in both the first cartridge and the first tank, the positions in the first object having a first position corresponding to a possible minimum residual quantity of the printing agent in the first state,
   wherein positions in the second object indicate possible residual quantities of the printing agent to be supplied to the first print execution device in a second state where the printing agent does not remain in the first cartridge but remains in the first tank, the positions in the second object having a second position and a third position, the second position corresponding to a possible maximum residual quantity of the printing agent in the second state, the third position corresponding to a possible minimum residual quantity of the printing agent in the second state,
   wherein the second display image includes a third object,
   wherein positions in the third object indicate possible residual quantities of the printing agent to be supplied to the second print execution device in a third state where the printing agent remains in the second cartridge, the positions in the third object having a fourth position corresponding to a possible minimum residual quantity of the printing agent in the third state,
   wherein the first position and the fourth position are aligned at a reference position.

2. The information processing apparatus according to claim 1, wherein the display screen is divided into a first region and a second region by an imaginary reference line passing the reference position, wherein the first object and the third object are located within the first region, and the second object is located within the second region.

3. The information processing apparatus according to claim 1, wherein the display screen is divided into a first region and a second region by a imaginary reference line passing the reference position, wherein all of the first object, the second object, and the third object are located within the first region.

4. The information processing apparatus according to claim 1, wherein the second object is positioned so that the second position is closer to the reference position than the third position is to the reference position.

5. The information processing apparatus according to claim 1, wherein the second supply portion is the third type of supply portion, and is configured to supply the printing agent stored in the second cartridge to the second print execution device without any tank between the second cartridge and the second print execution device.

6. The information processing apparatus according to claim 1, wherein the second supply portion is the second type of supply portion and is configured to supply the printing agent stored in the second tank to the second print execution device, wherein the second display image further includes a fourth object, wherein the positions in the third object indicates the possible residual quantities of the printing agent in the third state where the printing agent remains in both the second cartridge and the second tank, wherein positions in the fourth object indicates possible residual quantities of the printing agent to be supplied to the second print execution device in a fourth state where the printing agent does not remain in the second cartridge but remains in the second tank, the positions in the fourth object including a fifth position and a sixth position, the fifth position corresponding to a possible maximum residual quantity of the printing agent in the fourth state, the sixth position corresponding to a possible minimum residual quantity of the printing agent in the fourth state.

7. The information processing apparatus according to claim 1, wherein each of the first object, the second object, and the third object is a straight or curved band like object extending in a longitudinal direction, wherein, for each of the first object, the second object, and the third object, one position in the longitudinal direction corresponds to a first residual quantity, wherein, for each of the first object, the second object, and the third object, another position, which is closer to an end position than the one position to the end position in the longitudinal direction, corresponds to a second residual quantity smaller than the first residual quantity.

8. The information processing apparatus according to claim 1, wherein the first index value is a ratio of a residual quantity of the printing agent stored in the first cartridge to an initial quantity of the printing agent stored in the first cartridge, wherein the second index value is a ratio of a residual quantity of the printing agent stored in the second cartridge to an initial quantity of the printing agent stored in the second cartridge.

9. The information processing apparatus according to claim 1, wherein the first index value is one of a residual quantity of the printing agent stored in the first cartridge and printable sheet number which is capable of being printed by using the residual quantity of the printing agent stored in the first cartridge, wherein the second index value is one of a residual quantity of the printing agent stored in the second cartridge and printable sheet number which is capable of being printed by using the residual quantity of the printing agent stored in the second cartridge.

10. The information processing apparatus according to claim 9, wherein the initial quantity of the printing agent stored in the first cartridge is a first quantity, and the initial quantity of the printing agent stored in the second cartridge is a second quantity, wherein a size of the first object and a size of the second object are determined by using one of first data and second data, the first data including the first quantity and the second quantity, the second data including first printable sheet number which is capable of being printed by using the first quantity and second printable sheet number which is capable of being printed by using the second quantity.

11. The information processing apparatus according to claim 1, further comprising a communication interface configured to communicate with a plurality of printers, the plurality of printers including a first printer and a second printer, the first printer having the first supply portion and the first print execution device, the second printer having the second supply portion and the second print execution device, wherein the first information is acquired from the first printer via the communication interface, wherein the second information is acquired from the second printer via the communication interface.

12. An information processing apparatus comprising a processor configured to perform:

acquiring first information on a residual quantity of printing agent stored in a first cartridge mounted on a first supply portion, the first supply portion being a first type of supply portion including a first tank configured to store printing agent supplied from the first cartridge, the first supply portion being configured to supply the printing agent stored in the first tank to a first print execution device;

acquiring second information on a residual quantity of printing agent stored in a second cartridge mounted on a second supply portion, the second supply portion being one of a second type of supply portion including a second tank and a third type of supply portion without any tank, the second tank configured to store printing agent supplied from the second cartridge and having a volume different from that of the first tank, the second supply portion being configured to supply the printing agent stored in the second cartridge to a second print execution device;

generating display screen data representing a display screen including a first display image and a second display image, the first display image being for expressing a first index value based on the first information, the first index value concerning a residual quantity of the printing agent to be supplied to the first print execution device, the second display image being for expressing a second index value based on the second information, the second index value concerning a residual quantity of the printing agent to be supplied to the second print execution device; and outputting the display screen data, wherein the first display image includes a first object and a second object, wherein positions in the first object indicate possible residual quantities of the printing agent to be supplied to the first print execution device in a first state where printing agent remains in both the first cartridge and the first tank, the positions in the first object having a first position corresponding to a possible minimum residual quantity of the printing agent in the first state, wherein positions in the second object indicate possible residual quantities of the printing agent to be supplied to the first print execution device in a second state where the printing agent does not remain in the first cartridge but remains in the first tank, the positions in the second object having a second position and a third position, the second position corresponding to a possible maximum residual quantity of the printing agent in the second state, the third position corresponding to a possible minimum residual quantity of the printing agent in the second state, wherein the second display image includes a third object, wherein positions in the third object indicate possible residual quantities of the printing agent to be supplied to the second print execution device in a third state where the printing agent remains in the second cartridge, the positions in the third object having a fourth position corresponding to a possible minimum residual quantity of the printing agent in the third state, wherein the display screen is divided into a first region and a second region by an imaginary reference line, wherein the first object and the third object are located within the first region, and the second object is located within the second region.

13. The information processing apparatus according to claim 12, wherein each of the first object, the second object, and the third object is a band like object extending in a longitudinal direction, wherein the imaginary reference line crosses the longitudinal direction.

14. The information processing apparatus according to claim 12, wherein the second object is positioned so that the second position is closer to the reference line than the third position is to the imaginary reference line.

15. The information processing apparatus according to claim 12, wherein the second supply portion is the third type of supply portion, and is configured to supply the printing agent stored in the second cartridge to the second print execution device without any tank between the second cartridge and the second print execution device.

16. The information processing apparatus according to claim 12, wherein the second supply portion is the second type of supply portion and is configured to supply the printing agent stored in the second tank to the second print execution device, wherein the second display image further includes a fourth object, wherein the positions in the third object indicates the possible residual quantities of the printing agent in the third state where the printing agent remains in both the second cartridge and the second tank, wherein positions in the fourth object indicates possible residual quantities of the printing agent to be supplied to the second print execution device in a fourth state where the printing agent does not remain in the second cartridge but remains in the second tank, the positions in the fourth object including a fifth position and a sixth position, the fifth position corresponding to a possible maximum residual quantity of the printing agent in the fourth state, the sixth position corresponding to a possible minimum residual quantity of the printing agent in the fourth state.

17. The information processing apparatus according to claim 12, wherein each of the first object, the second object, and the third object is a straight or curved band like object extending in a longitudinal direction, wherein the imaginary reference line crosses the longitudinal direction, wherein, for each of the first object, the second object, and the third object, one position in the longitudinal direction corresponds to a first residual quantity, wherein, for each of the first object, the second object, and the third object, another position, which is closer to an end position than the one position to the end position in the longitudinal direction, corresponds to a second residual quantity smaller than the first residual quantity.

18. The information processing apparatus according to claim 12, wherein the first index value is a ratio of a residual quantity of the printing agent stored in the first cartridge to an initial quantity of the printing agent stored in the first cartridge, wherein the second index value is a ratio of a residual quantity of the printing agent stored in the second cartridge to an initial quantity of the printing agent stored in the second cartridge.

19. The information processing apparatus according to claim 12, wherein the first index value is one of a residual quantity of the printing agent stored in the first cartridge and printable sheet number which is capable of being printed by using the residual quantity of the printing agent stored in the first cartridge, wherein the second index value is one of a residual quantity of the printing agent stored in the second cartridge and printable sheet number which is capable of being printed by using the residual quantity of the printing agent stored in the second cartridge.

20. The information processing apparatus according to claim 19, wherein the initial quantity of the printing agent stored in the first cartridge is a first quantity, and the initial quantity of the printing agent stored in the second cartridge is a second quantity, wherein a size of the first object and a size of the second object are determined by using one of first data and second data, the first data including the first quantity and the second quantity, the second data including first printable sheet number which is capable of being printed by using the first quantity and second printable sheet number which is capable of being printed by using the second quantity.

21. The information processing apparatus according to claim 12, further comprising a communication interface configured to communicate with a plurality of printers, the plurality of printers including a first printer and a second printer, the first printer having the first supply portion and the first print execution device, the second printer having the second supply portion and the second print execution device, wherein the first information is acquired from the first printer via the communication interface, wherein the second information is acquired from the second printer via the communication interface.

22. A non-transitory computer readable storage medium storing a set of program instructions for an information processing apparatus including a processor, the set of program instructions comprising:

acquiring first information on a residual quantity of printing agent stored in a first cartridge mounted on a first supply portion, the first supply portion being a first type of supply portion including a first tank configured to store printing agent supplied from the first cartridge, the first supply portion being configured to supply the printing agent stored in the first tank to a first print execution device;

acquiring second information on a residual quantity of printing agent stored in a second cartridge mounted on a second supply portion, the second supply portion being one of a second type of supply portion including a second tank and a third type of supply portion without any tank, the second tank configured to store printing agent supplied from the second cartridge and having a volume different from that of the first tank, the second supply portion being configured to supply the printing agent stored in the second cartridge to a second print execution device;

generating display screen data representing a display screen including a first display image and a second display image, the first display image being for expressing a first index value based on the first information, the first index value concerning a residual quantity of the printing agent to be supplied to the first print execution device, the second display image being for expressing a second index value based on the second information, the second index value concerning a residual quantity of the printing agent to be supplied to the second print execution device; and outputting the display screen data, wherein the first display image includes a first object and a second object, wherein positions in the first object indicate possible residual quantities of the printing agent to be supplied to the first print execution device in a first state where printing agent remains in both the first cartridge and the first tank, the positions in the first object having a first position corresponding to a possible minimum residual quantity of the printing agent in the first state, wherein positions in the second object indicate possible residual quantities of the printing agent to be supplied to the first print execution device in a second state where the printing agent does not remain in the first cartridge but remains in the first tank, the positions in the second object having a second position and a third position, the second position corresponding to a possible maximum residual quantity of the printing agent in the second state, the third position corresponding to a possible minimum residual quantity of the printing agent in the second state, wherein the second display image includes a third object, wherein positions in the third object indicate possible residual quantities of the printing agent to be supplied to the second print execution device in a third state where the printing agent remains in the second cartridge, the positions in the third object having a fourth position corresponding to a possible minimum residual quantity of the printing agent in the third state, wherein the first position and the fourth position are aligned at a reference position.

23. The non-transitory computer readable storage medium according to claim 22, wherein the display screen is divided into a first region and a second region by an imaginary reference line passing the reference position, wherein the first object and the third object are located within the first region, and the second object is located within the second region.

24. The non-transitory computer readable storage medium according to claim 22, wherein the display screen is divided into a first region and a second region by a imaginary reference line passing the reference position, wherein all of the first object, the second object, and the third object are located within the first region.

25. The non-transitory computer readable storage medium according to claim 22, wherein the second object is positioned so that the second position is closer to the reference position than the third position is to the reference position.

26. The non-transitory computer readable storage medium according to claim 22, wherein the second supply portion is the third type of supply portion, and is configured to supply the printing agent stored in the second cartridge to the second print execution device without any tank between the second cartridge and the second print execution device.

27. The non-transitory computer readable storage medium according to claim 22, wherein the second supply portion is the second type of supply portion and is configured to supply the printing agent stored in the second tank to the second print execution device, wherein the second display image further includes a fourth object, wherein the positions in the third object indicates the possible residual quantities of the printing agent in the third state where the printing agent remains in both the second cartridge and the second tank, wherein positions in the fourth object indicates possible residual quantities of the printing agent to be supplied to the second print execution device in a fourth state where the printing agent does not remain in the second cartridge but remains in the second tank, the positions in the fourth object including a fifth position and a sixth position, the fifth position corresponding to a possible maximum residual quantity of the printing agent in the fourth state, the sixth position corresponding to a possible minimum residual quantity of the printing agent in the fourth state.

28. The non-transitory computer readable storage medium according to claim 22, wherein each of the first object, the second object, and the third object is a straight or curved band like object extending in a longitudinal direction, wherein, for each of the first object, the second object, and the third object, one position in the longitudinal direction corresponds to a first residual quantity, wherein, for each of the first object, the second object, and the third object, another position, which is closer to an end position than the one position to the end position in the longitudinal direction, corresponds to a second residual quantity smaller than the first residual quantity.

29. The non-transitory computer readable storage medium according to claim 22, wherein the first index value is a ratio of a residual quantity of the printing agent stored in the first cartridge to an initial quantity of the printing agent stored in the first cartridge, wherein the second index value is a ratio of a residual quantity of the printing agent stored in the second cartridge to an initial quantity of the printing agent stored in the second cartridge.

30. The non-transitory computer readable storage medium according to claim 22, wherein the first index value is one of a residual quantity of the printing agent stored in the first cartridge and printable sheet number which is capable of being printed by using the residual quantity of the printing agent stored in the first cartridge,
wherein the second index value is one of a residual quantity of the printing agent stored in the second cartridge and printable sheet number which is capable of being printed by using the residual quantity of the printing agent stored in the second cartridge.

31. The non-transitory computer readable storage medium according to claim 30, wherein the initial quantity of the printing agent stored in the first cartridge is a first quantity, and the initial quantity of the printing agent stored in the second cartridge is a second quantity,
wherein a size of the first object and a size of the second object are determined by using one of first data and second data, the first data including the first quantity and the second quantity, the second data including first printable sheet number which is capable of being printed by using the first quantity and second printable sheet number which is capable of being printed by using the second quantity.

32. The non-transitory computer readable storage medium according to claim 22, further comprising a communication interface configured to communicate with a plurality of printers, the plurality of printers including a first printer and a second printer, the first printer having the first supply portion and the first print execution device, the second printer having the second supply portion and the second print execution device,
wherein the first information is acquired from the first printer via the communication interface,
wherein the second information is acquired from the second printer via the communication interface.

33. A non-transitory computer readable storage medium storing a set of program instructions for an information processing apparatus including a processor, the set of program instructions comprising:
acquiring first information on a residual quantity of printing agent stored in a first cartridge mounted on a first supply portion, the first supply portion being a first type of supply portion including a first tank configured to store printing agent supplied from the first cartridge, the first supply portion being configured to supply the printing agent stored in the first tank to a first print execution device;
acquiring second information on a residual quantity of printing agent stored in a second cartridge mounted on a second supply portion, the second supply portion being one of a second type of supply portion including a second tank and a third type of supply portion without any tank, the second tank configured to store printing agent supplied from the second cartridge and having a volume different from that of the first tank, the second supply portion being configured to supply the printing agent stored in the second cartridge to a second print execution device;
generating display screen data representing a display screen including a first display image and a second display image, the first display image being for expressing a first index value based on the first information, the first index value concerning a residual quantity of the printing agent to be supplied to the first print execution device, the second display image being for expressing a second index value based on the second information, the second index value concerning a residual quantity of the printing agent to be supplied to the second print execution device; and
outputting the display screen data,
wherein the first display image includes a first object and a second object,
wherein positions in the first object indicate possible residual quantities of the printing agent to be supplied to the first print execution device in a first state where printing agent remains in both the first cartridge and the first tank, the positions in the first object having a first position corresponding to a possible minimum residual quantity of the printing agent in the first state,
wherein positions in the second object indicate possible residual quantities of the printing agent to be supplied to the first print execution device in a second state where the printing agent does not remain in the first cartridge but remains in the first tank, the positions in the second object having a second position and a third position, the second position corresponding to a possible maximum residual quantity of the printing agent in the second state, the third position corresponding to a possible minimum residual quantity of the printing agent in the second state,
wherein the second display image includes a third object,
wherein positions in the third object indicate possible residual quantities of the printing agent to be supplied to the second print execution device in a third state where the printing agent remains in the second cartridge, the positions in the third object having a fourth position corresponding to a possible minimum residual quantity of the printing agent in the third state,
wherein the display screen is divided into a first region and a second region by an imaginary reference line,
wherein the first object and the third object are located within the first region, and the second object is located within the second region.

34. The non-transitory computer readable storage medium according to claim 33, wherein each of the first object, the second object, and the third object is a band like object extending in a longitudinal direction,
wherein the imaginary reference line crosses the longitudinal direction.

35. The non-transitory computer readable storage medium according to claim 33, wherein the second object is positioned so that the second position is closer to the reference line than the third position is to the imaginary reference line.

36. The non-transitory computer readable storage medium according to claim 33, wherein the second supply portion is the third type of supply portion, and is configured to supply the printing agent stored in the second cartridge to the second print execution device without any tank between the second cartridge and the second print execution device.

37. The non-transitory computer readable storage medium according to claim 33, wherein the second supply portion is the second type of supply portion and is configured to supply the printing agent stored in the second tank to the second print execution device,
wherein the second display image further includes a fourth object,
wherein the positions in the third object indicates the possible residual quantities of the printing agent in the third state where the printing agent remains in both the second cartridge and the second tank,
wherein positions in the fourth object indicates possible residual quantities of the printing agent to be supplied to the second print execution device in a fourth state where the printing agent does not remain in the second cartridge but remains in the second tank, the positions in the fourth object including a fifth position and a sixth position, the fifth position corresponding to a possible maximum residual quantity of the printing agent in the fourth state, the sixth position corresponding to a possible minimum residual quantity of the printing agent in the fourth state.

38. The non-transitory computer readable storage medium according to claim 33, wherein each of the first object, the second object, and the third object is a straight or curved band like object extending in a longitudinal direction, wherein the imaginary reference line crosses the longitudinal direction, wherein, for each of the first object, the second object, and the third object, one position in the longitudinal direction corresponds to a first residual quantity, wherein, for each of the first object, the second object, and the third object, another position, which is closer to an end position than the one position to the end position in the longitudinal direction, corresponds to a second residual quantity smaller than the first residual quantity.

39. The non-transitory computer readable storage medium according to claim 33, wherein the first index value is a ratio of a residual quantity of the printing agent stored in the first cartridge to an initial quantity of the printing agent stored in the first cartridge, wherein the second index value is a ratio of a residual quantity of the printing agent stored in the second cartridge to an initial quantity of the printing agent stored in the second cartridge.

40. The non-transitory computer readable storage medium according to claim 33, wherein the first index value is one of a residual quantity of the printing agent stored in the first cartridge and printable sheet number which is capable of being printed by using the residual quantity of the printing agent stored in the first cartridge, wherein the second index value is one of a residual quantity of the printing agent stored in the second cartridge and printable sheet number which is capable of being printed by using the residual quantity of the printing agent stored in the second cartridge.

41. The non-transitory computer readable storage medium according to claim 40, wherein the initial quantity of the printing agent stored in the first cartridge is a first quantity, and the initial quantity of the printing agent stored in the second cartridge is a second quantity, wherein a size of the first object and a size of the second object are determined by using one of first data and second data, the first data including the first quantity and the second quantity, the second data including first printable sheet number which is capable of being printed by using the first quantity and second printable sheet number which is capable of being printed by using the second quantity.

42. The non-transitory computer readable storage medium according to claim 33, further comprising a communication interface configured to communicate with a plurality of printers, the plurality of printers including a first printer and a second printer, the first printer having the first supply portion and the first print execution device, the second printer having the second supply portion and the second print execution device, wherein the first information is acquired from the first printer via the communication interface, wherein the second information is acquired from the second printer via the communication interface.

* * * * *